United States Patent [19]

Gardner et al.

[11] Patent Number: 5,053,190
[45] Date of Patent: Oct. 1, 1991

[54] WATER COOLED NUCLEAR REACTOR AND PRESSURISER ASSEMBLY

[75] Inventors: Frederick J. Gardner, Derby; Rodney Strong, Nottingham, both of England

[73] Assignee: Rolls-Royce and Associates Limited, Derby, England

[21] Appl. No.: 333,975

[22] Filed: Apr. 6, 1989

[30] Foreign Application Priority Data

Apr. 13, 1988 [GB] United Kingdom ............... 8808707

[51] Int. Cl.$^5$ ............................................. G21C 15/00
[52] U.S. Cl. ................................... 376/366; 376/307; 376/361; 376/367
[58] Field of Search ............... 376/361, 366, 367, 307

[56] References Cited

U.S. PATENT DOCUMENTS

| | | | |
|---|---|---|---|
| 3,245,881 | 7/1962 | Ammon et al. | 176/53 |
| 3,607,634 | 9/1971 | Gerard et al. | 176/54 |
| 4,021,301 | 5/1977 | Frei | 376/328 |
| 4,470,948 | 9/1984 | Aanstad et al. | 376/216 |
| 4,473,528 | 9/1984 | Kleimola | 376/282 |
| 4,717,532 | 1/1988 | Schwab | 376/283 |
| 4,728,486 | 3/1988 | Kish | 376/307 |
| 4,753,771 | 6/1988 | Conway et al. | 376/282 |
| 4,897,240 | 1/1990 | Sako | 376/328 |

FOREIGN PATENT DOCUMENTS

| | | |
|---|---|---|
| 2026217 | 5/1970 | Fed. Rep. of Germany . |
| 14371181 | 5/1964 | France . |
| 913645 | 2/1959 | United Kingdom . |
| 1092107 | 11/1962 | United Kingdom . |
| 1093078 | 12/1964 | United Kingdom . |
| 1102606 | 8/1965 | United Kingdom . |
| 1531860 | 3/1976 | United Kingdom . |

Primary Examiner—Robert L. Stoll
Assistant Examiner—N. Bhat
Attorney, Agent, or Firm—Cushman, Darby & Cushman

[57] ABSTRACT

A water cooled nuclear reactor comprises a reactor core, a primary water coolant circuit and a pressurizer arranged as an integral unit in a pressure vessel. The pressure vessel is divided into an upper chamber and a lower chamber by a casing, the reactor core and primary coolant circuit are arranged in the lower chamber and the pressuriser is arranged in the upper chamber.

A plurality of pipes interconnect a steam space of the pressuriser with an upper portion of the primary coolant circuit via ports in the casing. A plurality of reentrant surge ports interconnect a water space of the pressuriser with a lower portion of the primary coolant circuit. The surge ports have low flow resistance for water from the water space to the primary coolant circuit and high flow resistance in the opposite direction.

35 Claims, 18 Drawing Sheets

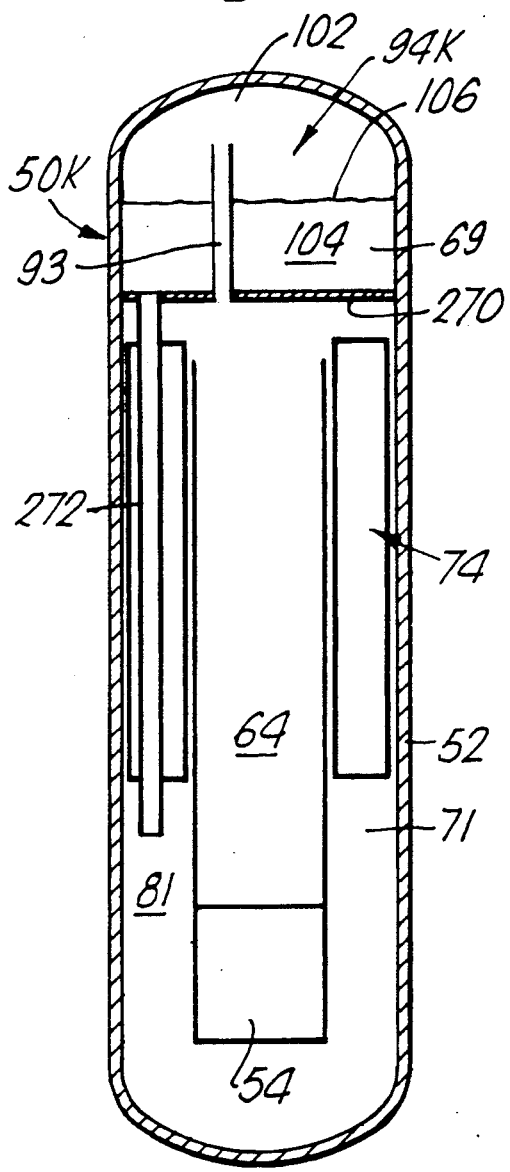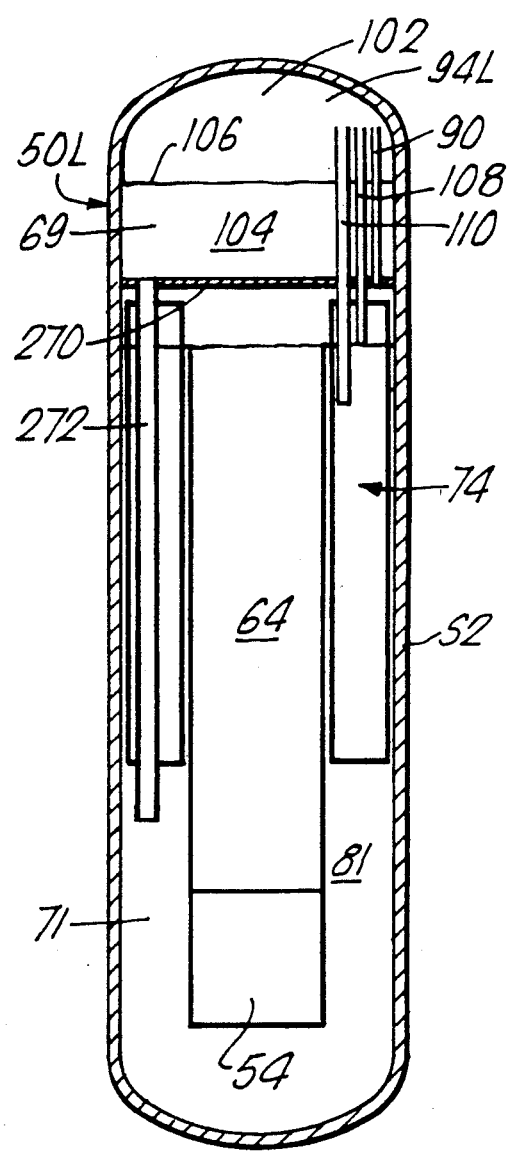

WATER COOLED NUCLEAR REACTOR AND PRESSURISER ASSEMBLY

The present invention primarily relates to integral water cooled nuclear reactors with pressurisers, and is particularly applicable to water cooled nuclear reactors of the integral pressurised water reactor (PWR) type and the integral indirect cycle boiling water reactor (BWR) type with integral pressurisers. However the invention is also applicable to integral water cooled nuclear reactors with separate pressurisers and to dispersed PWR's with separate pressurisers.

The present invention is particularly suitable for use with light water, the invention is also applicable for use with heavy water moderated water cooled reactor types.

A problem associated with integral pressurised water reactors (PWR's) of the saturated self pressurised type is that the reactor cores have a certain amount of boiling in the moderator/coolant to make up for heat losses from the pressuriser and due to non-uniformity in the distribution of cooling across the reactor core. Perturbations in the boiling voidage can cause unwanted disturbances in power level and flow distribution in the reactor core. Also, the transient and steady state pressure of the reactor coolant can be affected by variations in the patterns and levels of boiling voidage. In the prior art voidage has been controlled by means of an external pressuriser.

In contrast to pressurised water reactors (PWR's), boiling water reactors (BWR's) are designed to operate with substantial amounts of boiling voidage in their reactor cores. But unlike PWR's in which an intermediate heat exchanger or steam generator is used to raise steam for an indirect turbo-generator Rankine cycle, in most BWR power plants the steam raised in the reactor core is ducted to the turbo-alternator in a direct Rankine cycle arrangement. A disadvantage of the direct cycle arrangement is that the working fluid passing through the turbine, condenser and feed system of the power plant is slightly radioactive. An alternative arrangement is to provide within the steam space of the boiling water reactor pressure vessel, an intermediate heat exchanger or steam generator, as in the indirect PWR. However, in the indirect cycle BWR case steam vapour from the reactor core condenses on the primary circuit side of the intermediate heat exchanger steam generator and is returned directly to the reactor core without leaving the reactor pressure vessel.

As with a dispersed PWR pressure control and transient coolant inventory control in an integral PWR could be effected by means of an external or integral pressuriser which communicates with the primary circuit through a surge pipeline. However a simple pressuriser/surgeline arrangement could not be employed with an indirect cycle BWR as it is intrinsically unstable. A slight excess of reactor core power over steam demand power would cause the pressuriser to flood. In the case of a PWR the simple pressuriser/surge line arrangement is meta-stable. Here the pressuriser is maintained at a higher temperature than in the reactor pressure vessel and reactor core and a large excess of reactor core power over steam demand is required to cause the pressuriser to flood and the reactor pressure vessel or primary circuit and reactor core to become blanketed in steam.

A further problem with water cooled reactors is that under some accident conditions the supply of coolant to the reactor core can be suddenly impaired or lost, resulting in severe reactor core damage in a timescale shorter than can be prevented by engineered safety systems of the prior art.

The present invention seeks to provide an integral pressuriser for integral PWR's for controlling the unwanted effects of variation of in core voidage in self pressurised integral PWR's under steady state and transient conditions.

The present invention also seeks to provide an integral pressuriser for integral indirect cycle BWR's for controlling primary pressure, primary water level in the steam generator and the degree of boiling in the reactor core under steady state and transient conditions.

The present invention also seeks to provide an integral pressuriser for integral PWR's and indirect cycle BWR's which is absolutely stable in normal, upset and accident conditions.

The present invention also seeks to provide an external pressuriser for integral PWR's and indirect cycle BWR's which is absolutely stable under normal, upset and accident conditions.

The present invention further seeks to provide a reserve supply of coolant immediately and continuously available, to the primary circuit and reactor core under the action of gravity, and a means for preventing steam blanketing of the primary circuit and reactor core during accident conditions.

The present invention also seeks to provide a low cost water cooled nuclear reactor power plant in low and moderate power ratings.

Accordingly the present invention provides a water cooled nuclear reactor and pressuriser assembly comprising a reactor core, a pressuriser, a primary water coolant circuit arranged to cool the reactor core, the reactor core and at least a portion of the primary water coolant circuit being enclosed by a pressure vessel, the pressuriser having a water space and a steam space, at least a portion of the water space of the pressuriser being positioned above an upper portion of the primary water coolant circuit, at least one means which communicates between the pressuriser and the primary water coolant circuit to connect the steam space of the pressuriser with the upper portion of the primary water coolant circuit, at least one surge port means which communicates between the pressuriser and the primary water coolant circuit to connect the water space of the pressuriser with a portion of the primary water coolant circuit positioned below any normal effective water level range in the primary water coolant circuit, the at least one surge port means being arranged to have relatively low flow resistance for water from the water space of the pressuriser to the primary water coolant circuit and relatively high flow resistance for water from the primary water coolant circuit to the water space of the pressuriser whereby the at least one means which communicates between the steam space of the pressuriser and the upper portion of the primary water coolant circuit allows excess vapour formed in the primary water coolant circuit to flow to the steam space of the pressuriser to increase the stability of the assembly.

The reactor core, the primary coolant circuit and the pressuriser may be arranged as an integral unit enclosed by the pressure vessel, at least one casing arranged in the pressure vessel to substantially divide the pressure vessel into a first chamber and a second chamber, the reactor core and the primary coolant circuit being arranged in the second chamber, the pressuriser being arranged in the first chamber, the casing preventing interaction between the water in the primary water coolant circuit and the water in the water space of the pressuriser.

The reactor core may be arranged in the lower region of the lower chamber, the primary coolant circuit comprising a riser passage to convey relatively hot water and steam to at least one heat exchanger, and a downcomer passage to convey relatively cool water from the at least one heat exchanger to the reactor core.

The riser passage may be defined by a hollow cylindrical member, the downcomer passage being defined between the hollow cylindrical member and the pressure vessel.

The at least one heat exchanger may be positioned in an upper region of the downcomer passage.

The at least one surge port means may comprise a hydraulic diode.

The casing may comprise an annular member which extends downwards from the peripheral region thereof, an annular passage being formed between the annular member of the casing and the pressure vessel for the flow of water from the water space of the pressuriser to the primary coolant circuit and from the primary coolant circuit to the steam space of the pressuriser.

The pressuriser may form a surge tank positioned in the first chamber, the surge tank being defined by the pressure vessel and the casing.

The casing may comprise an annular member which extends downwards from a peripheral region thereof, the annular member being secured to the pressure vessel to form an annular lower portion of the surge tank with the pressure vessel.

The casing may comprise a bottom member positioned below the reactor core, the casing dividing the pressure vessel into a first outer chamber and a second inner chamber, the second inner chamber being substantially defined by the casing.

A peripheral region of the casing may be secured to the pressure vessel, the casing may be arranged to divide the pressure vessel into a first vertically upper chamber and a second vertically lower chamber.

The at least one surge port means may connect a lower portion of the water space of the surge tank with the primary water coolant circuit in the region of the reactor core.

The at least one surge port means may connect the lower portion of the water space of the surge tank with the primary water coolant circuit below the reactor core.

The riser passage may be defined by a hollow cylindrical member, the downcomer passage being defined between the hollow cylindrical member and the casing.

The pressuriser may be a separate pressuriser.

The at least one surge port means may connect a lower portion of the water space of the surge tank with a lower portion of the downcomer passage in the region of the heat exchanger.

The at least one surge port means may connect a lower portion of the water space of the surge tank with a lower portion of the downcomer passage below the heat exchanger.

The at least one surge port means may comprise a re-entrant nozzle.

The at least one surge port means may comprise a hydraulic diode.

The at least one means which communicates between the pressuriser and the primary coolant circuit may comprise at least one pipe which interconnects at least one port in the casing with the steam space in the pressuriser.

The casing may comprise an annular member which extends downwards from a central region thereof, a peripheral region of the casing may be sealingly secured to the pressure vessel, the annular member may be sealed at its lower end to form a lower portion of the surge tank.

At least one of the means which communicate between the pressuriser and the primary water coolant circuit may comprise a spray nozzle.

At least one of the means which communicate between the pressuriser and the primary water coolant circuit may connect the steam space of the pressuriser with the primary water coolant circuit above the heat exchanger.

The water cooled nuclear reactor may be an integral pressurised water reactor.

The pressuriser may have heating means to heat the water in the water space.

The water cooled nuclear reactor may be an integral indirect cycle boiling water reactor, the at least one means which communicates between the steam space of the pressuriser and the upper portion of the primary water coolant circuit controlling the effective water level in the primary water coolant circuit.

The present invention will be more fully described by way of example with reference to the accompanying drawings, in which:

FIG. 10A is a vertical cross-sectional diagrammatical view of tenth embodiment of a water cooled nuclear reactor with integral pressuriser according to the present invention.

FIG. 10B is a vertical cross-sectional diagrammatical view of an eleventh embodiment of a water cooled nuclear reactor with integral pressuriser according to the present invention.

Figure 1A:
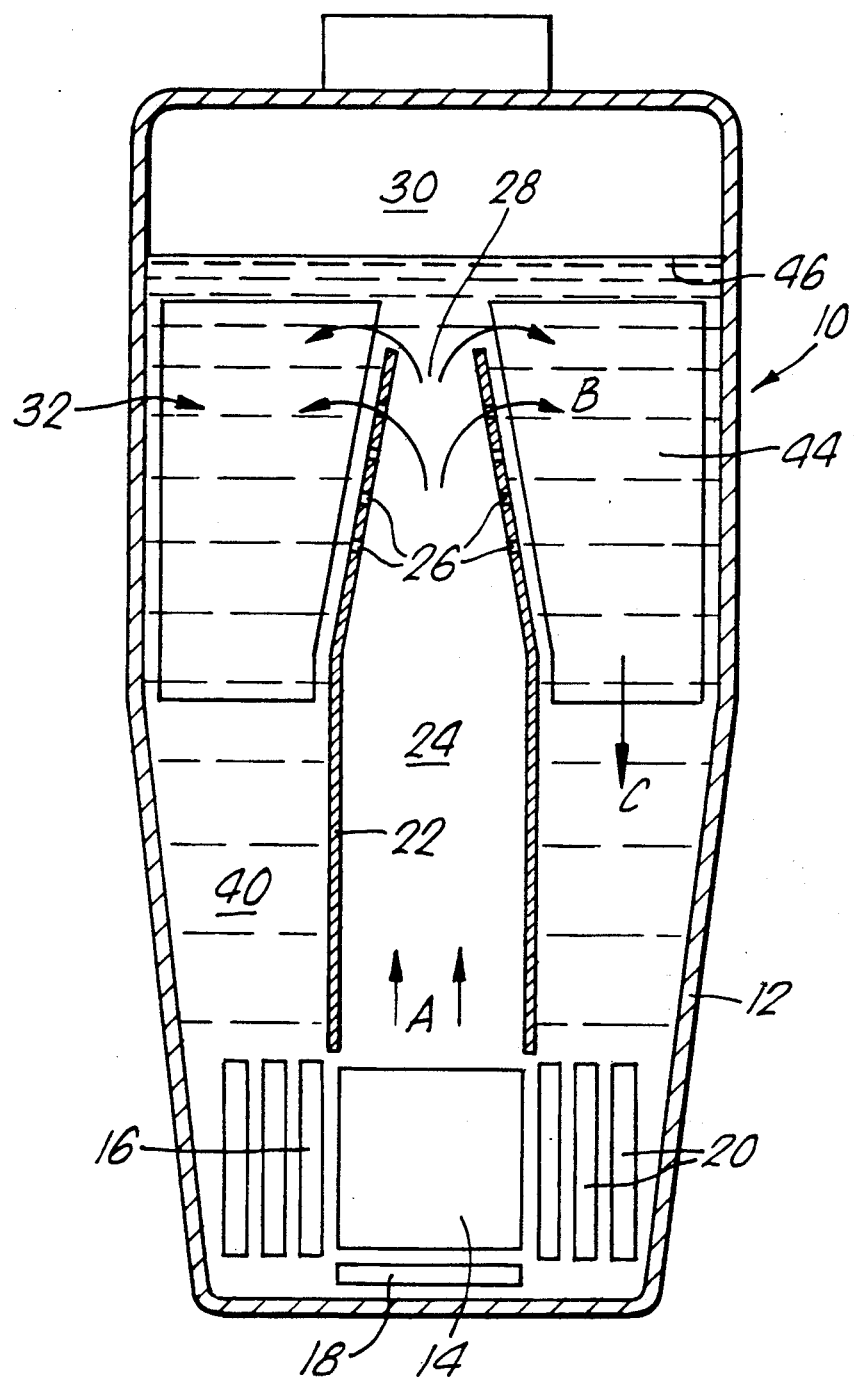
FIGS. 1A and 1B are vertical cross-sectional diagrammatical views of prior art water cooled nuclear reactors of the integral self pressurised type.
Figure 1B:
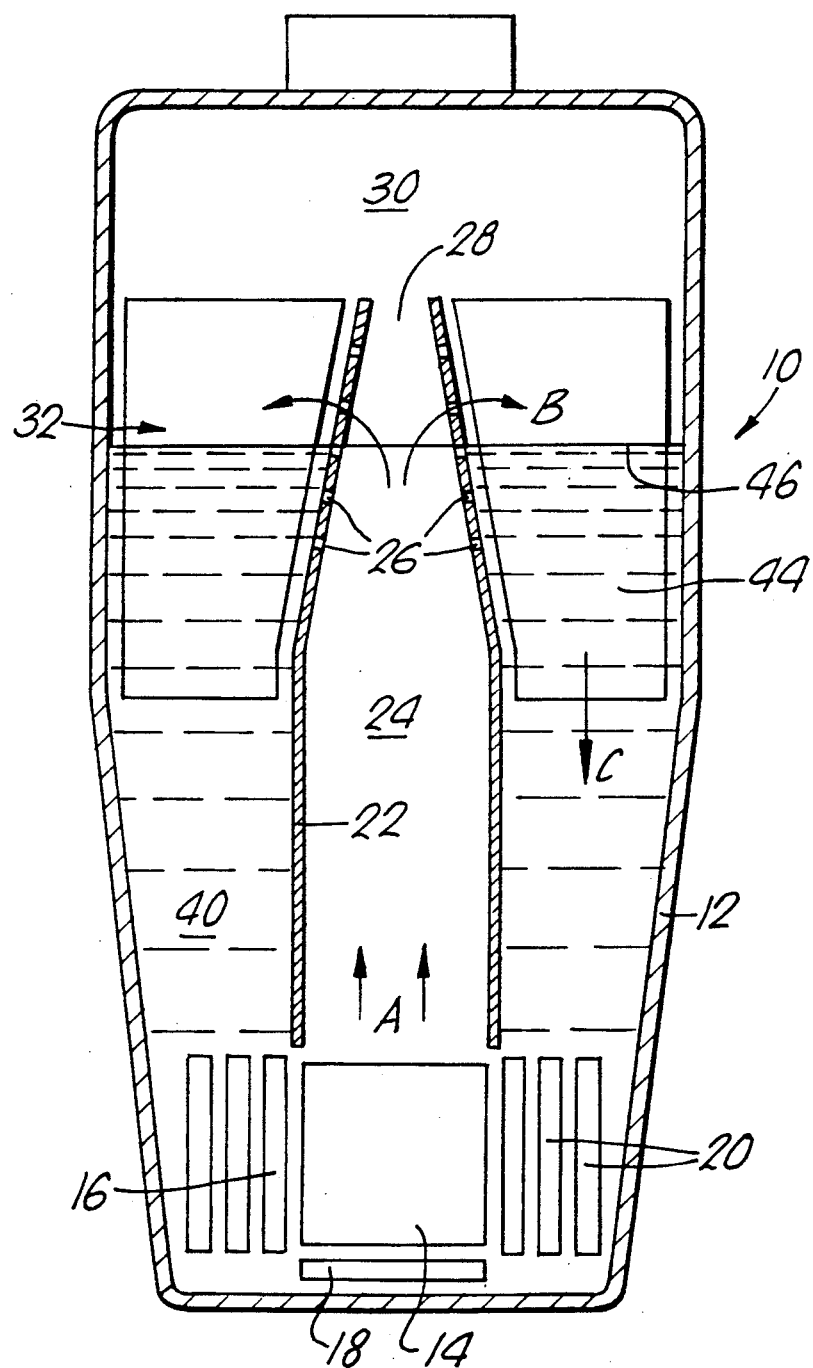

Two prior art integral water cooled nuclear reactors are shown in FIGS. 1A and 1B. FIG. 1A shows a self pressurised PWR of the saturated water type. FIG. 1B shows an indirect cycle BWR variant.

In both cases the nuclear reactor 10 comprises a pressure vessel 12 within which is positioned a reactor core 14. The reactor core includes a system of neutron absorbing movable control rods linked to drive mechanisms (not shown). The reactor core 14 is positioned substantially at the lower region of the pressure vessel 12, and the reactor core 14 is surrounded by a neutron reflector 16. A thermal shield 18 is positioned below the reactor core 14, and thermal shields 20 are positioned so as to surround the neutron reflector 16. The thermal shields 18,20 protect the pressure vessel 12 from radiation emanating from the reactor core 14.

A primary water coolant circuit is used to cool the reactor core 14, and the primary water coolant circuit uses natural circulation. The primary coolant circuit may be provided with pumps to drive the water around the coolant circuit. The primary water coolant circuit comprises a hollow cylindrical member 22 which is aligned with and positioned vertically above the reactor core 14 to define a riser passage 24 therein for the natural vertically upward flow of relatively hot coolant from the reactor core 14, and an annular downcomer passage 40 is defined with the pressure vessel 12 for the natural vertically downward return flow of relatively cool coolant to the reactor core 14.

The cylindrical member 22 does not extend completely to the top of the pressure vessel 12, and the upper region of the cylindrical member 22 is provided with apertures 26 for distributing the flow of the water coolant from the riser passage 24 to the annular downcomer passage 40. The upper end of the cylindrical member 22 has a large aperture 28 which connects the riser passage 24 to a steam space 30 formed in the upper region of the pressure vessel 12, to allow vapour from the reactor core 14 to flow into the steam space 30.

A secondary coolant circuit takes heat from the primary water coolant circuit for driving an electrical turbo-generator (not shown). The secondary coolant circuit may also take heat from the primary water coolant circuit for other purposes for example process heat, district heating or propulsion systems. The secondary coolant circuit comprises a heat exchanger 32 which is annular and positioned coaxially in the upper region of the annular downcomer passage 40. The heat exchanger 32 comprises one or more tubes which are arranged in an annulus, which receive secondary coolant from a supply of secondary coolant via a supply pipe (not shown) and inlet header (not shown), and which supply heated secondary coolant to an outlet header (not shown). The outlet header supplies the heated secondary coolant via a supply pipe (not shown), for any of the above mentioned purposes.

Primary water coolant descends the downcomer passage 40 passing over the outer surface of the heat exchanger tubes, and heat is transmitted to the secondary coolant inside the heat exchanger tubes.

The secondary coolant used in the embodiment is water, and the heat exchanger 32 is a steam generator which comprises one or more steam tubes. The steam generator could be a once through type or a recirculatory type which has a recirculating downcomer between the outlet header and the inlet header.

The steam tubes are of any suitable configuration for example as is well known in the art the steam tubes could be helically coiled tubes which extend between the inlet header and the outlet header. The helically coiled tubes may be arranged in tube bundles arranged circumferentially within the upper portion of the annular downcomer 40. British Patent No. 1386813 discloses a pressurised water reactor which has helically coiled tubes arranged in an annular steam generator, although the primary water coolant is pumped therethrough normally, natural water circulation takes place if there is a pump failure, this arrangement does not have an integral pressuriser.

The steam space 30 is formed above the water level 46 in the pressure vessel 12, and a water space 44 is formed below the water level 46 in the pressure vessel 12.

In the integral PWR type of nuclear reactor, shown in FIG. 1A, the heat exchanger 32 is positioned in the downcomer passage 40 wholly below the water level 46. In the indirect cycle BWR type of nuclear reactor, shown in FIG. 1B, the heat exchanger 32 is positioned in the downcomer passage 40, but an upper portion of the heat exchanger 32 protrudes above the water level 46 into the steam space 30. This promotes condensation of the primary coolant vapour in the steam space 30 on the exposed tubes of the heat exchanger 32 and bulk boiling of the primary coolant flowing through the core 14. In the integral PWR type of nuclear reactor the primary water level 46 is above the heat exchanger 32, preventing condensing heat transfer to the heat exchanger 32 and bulk boiling in the reactor core 14.

In the operation of the water cooled nuclear reactor 10 the fission of nuclear fuel in the reactor core 14 produces heat. The heat is carried away from the reactor core 14 by the primary water coolant circuit. The heating of the water in the vicinity of the reactor core 14 causes the water to flow in an upwards direction as shown by arrows A through the riser passage 24, the primary water then flows through the flow distribution apertures 26 in the cylindrical member 22 into the steam generator 32 to pass over the steam generator tubes as shown by arrows B. The primary water gives heat to the secondary water in the steam generator tubes on passing through the steam generator 32. The primary water then returns to the reactor core 14 through the annular downcomer passage 40 as shown by arrow C.

The steam space 30 pressurises the primary water coolant to a pressure corresponding to the saturation temperature of the reactor core primary coolant outlet temperature. As mentioned previously while operating the pressurised water reactors or boiling water reactors with this integral type of pressuriser have a certain amount of primary coolant voidage. The voidage in the primary coolant is variable and can cause unwanted perturbations in the core power level and flow distribution. Also, pressure transients can be exacerbated by positive reactivity feedback through the influence of pressure and power level on these voids with adverse effects on the pressure control and load following characteristics of the nuclear reactor.

Figure 2A:
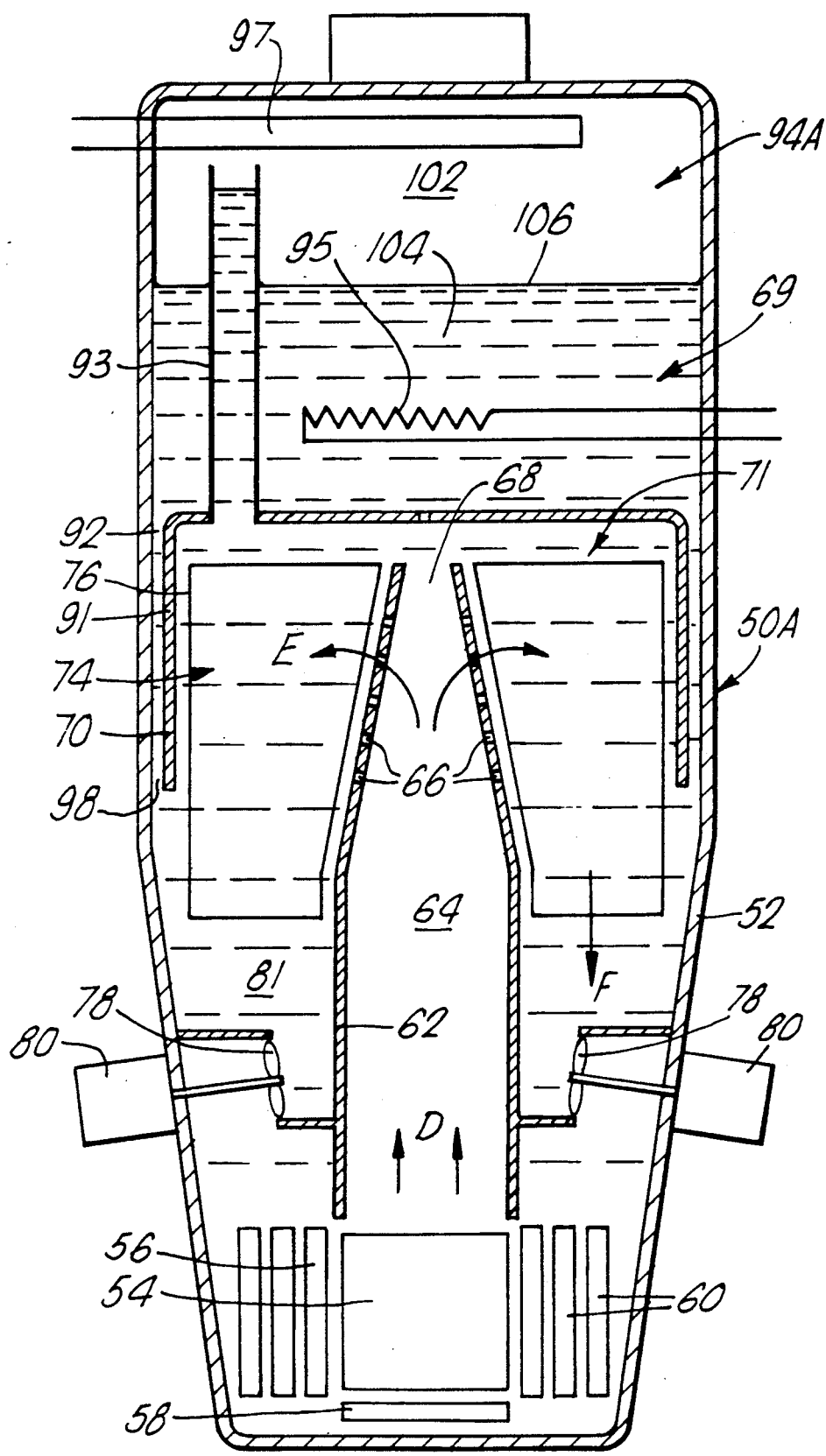
FIG. 2A is a vertical cross-sectional diagrammatical view of a water cooled nuclear reactor with integral pressuriser according to the present invention.

A water cooled PWR nuclear reactor 50A with integral pressuriser 94A according to the present invention is shown in FIG. 2A.

The water cooled PWR nuclear reactor 50A comprises a pressure vessel 52 within which is positioned a reactor core 54. The reactor core 54 is positioned substantially at the lower region of the pressure vessel 52, and the reactor core 54 is surrounded by a neutron reflector 56. The reactor core 54 includes a system of movable neutron absorbing control rods linked to drive mechanisms (not shown). A thermal shield 58 is positioned below the reactor core 54, and thermal shields 60 are positioned so as to surround the neutron reflector 56. The thermal shields 58,60 protect the pressure vessel 52 from radiation emanating from the reactor core 54.

A primary water coolant circuit is used to cool the reactor core 54, and the primary water coolant circuit uses a pumped flow or a natural circulating arrangement. The primary water coolant circuit comprises a hollow cylindrical member 62 which is aligned with and positioned vertically above the reactor core 54 to define a riser passage 64 therein for the natural vertically upward flow of relatively hot primary coolant from the reactor core 54, and an annular downcomer passage 81 is defined with the pressure vessel 52 for the natural vertically downward return flow of relatively cool primary coolant to the reactor core 54. The primary coolant circuit is also provided with one or more pumps 78, which are driven by motor 80. The pumps 78 are positioned in the downcomer passage 81.

A casing 70 is positioned in the pressure vessel 52, and divides the pressure vessel 52 into a first vertically upper chamber 69 and a second vertically lower chamber 71. The reactor core 54 and the primary water coolant circuit are arranged in the lower chamber 71.

The cylindrical member 62 extends towards but is spaced from the top of the lower chamber 71 defined by the casing 70, and the upper region of the cylindrical member 62 is provided with apertures 66 for the distribution of flow of the primary water coolant from the riser passage 64 to the upper part of the downcomer annular passage 81. The upper end of the cylindrical member 62 has a large aperture 68 which connects the riser passage 64 to the downcomer passage 81 and allows water and vapour from the reactor core to flow over the top of the cylindrical member 62 into the downcomer passage 81.

A secondary coolant circuit takes heat from the primary water coolant circuit. The secondary coolant circuit comprises a heat exchanger 74 which is annular and positioned coaxially in the upper region of the annular downcomer passage 81. The heat exchanger 74 comprises one or more tubes which are arranged in an annulus 76, which receive secondary coolant from a supply of secondary coolant via a supply pipe (not shown) and inlet header (not shown), and which supply heated secondary coolant via an outlet header (not shown) and a supply pipe (not shown) for driving an electrical turbo-generator, for district heating, process heat or a propulsion system.

The heat exchanger 74 in this example is a steam generator, and the secondary coolant used is water. The steam generator could be a once through type or a recirculatory type with downcomer pipes between the outlet and inlet headers.

The casing 70 has an annular member 91 which extends vertically downwards from the peripheral region of the casing 70. The annular member 91 is spaced from the pressure vessel 52 by a small annular passage 92. The annular member 91 extends downwards to a position in the downcomer of the primary coolant circuit. The annular member 91 as shown terminates above the bottom of the heat exchanger 74. However it is equally practical for the annular member 91 to terminate at the bottom of the heat exchanger 74, at any suitable location in the downcomer passage 81 between the heat exchanger 74 and the thermal shields 60 or beneath the level of the thermal shields 60.

The pressuriser 94A is positioned within the pressure vessel 52 in the vertically upper chamber 69 formed between the casing 70 and the pressure vessel 52. The pressuriser 94A forms a surge tank which contains water 104, and steam 102 separated by a water/steam interface or water level 106. One or more electrical immersion heaters 95 are provided in the pressuriser 94A positioned below the water level 106.

The annular passage 92 between the annular member 91 of the casing 70 and the pressure vessel 52 forms an extension to the pressuriser water space 104 and also acts as a surge flow path for the passage of water between the pressuriser 94A and the primary water coolant circuit. The lower end of the annular member 91 contains surge ports 98 which have hydraulic diodes (not shown) to effect a relatively low resistance to the flow of water from the pressuriser 94A water space 104 to the primary water coolant circuit downcomer 81, and a relatively high resistance to the flow of water from the primary water coolant circuit to the pressuriser 94A water space 104 through the annular passage 92.

It may be equally possible to arrange the size, geometry and location of the lower end of the annular member 91 so that the annular passage 92 formed with the pressure vessel 52 has these characteristics.

One or more large diameter vent pipes 93 interconnect the steam space 102 of the pressuriser 94A with an upper portion of the primary coolant circuit, as shown the vent pipe 93 extends from the pressuriser steam space 102 through the pressuriser water space 104 and through the casing 70.

Figure 2B:
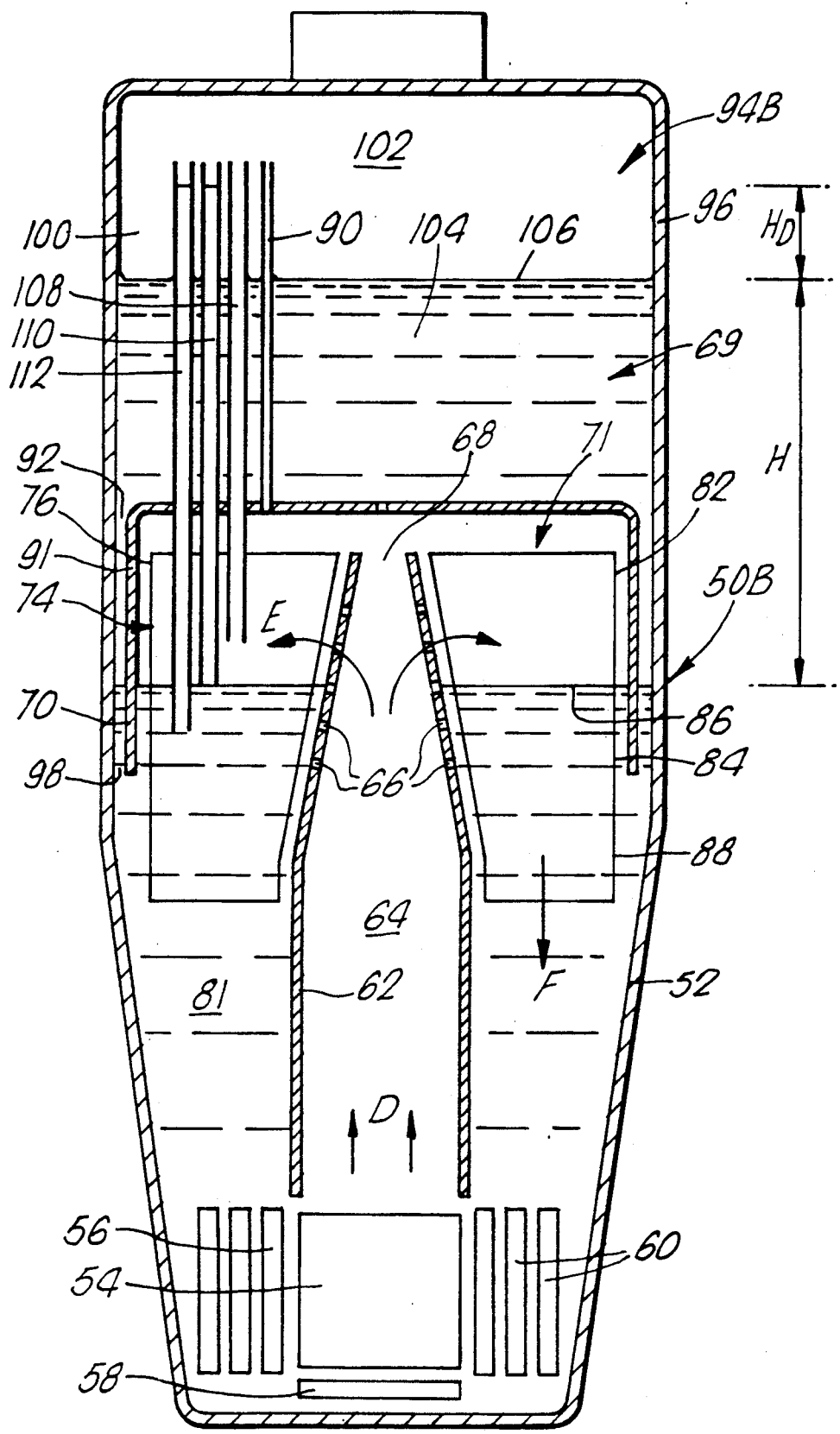
FIG. 2B is a vertical cross-sectional diagrammatical view of a second embodiment of a water cooled nuclear reactor with integral pressuriser according to the present invention.

A water cooled indirect cycle BWR nuclear reactor 50B with integral pressuriser 94B according to the present invention is shown in FIG. 2B. The arrangement of the water cooled BWR nuclear reactor 50B with integral pressuriser 94B is substantially the same as the arrangement of water cooled PWR nuclear reactor 50A with integral pressuriser 94A shown in FIG. 2A, and like parts are denoted by like numerals. The main difference is that condensing heat transfer from the primary coolant and bulk boiling in the reactor core is facilitated in the BWR variant in FIG. 2B but prevented in the PWR variant in FIG. 2A.

The water cooled indirect cycle BWR nuclear reactor 50B with integral pressuriser 94B differs in that an upper portion of the heat exchanger 74 protrudes above an effective primary water coolant level 86 within the primary coolant circuit into a steam space 82 defined by the casing 70, whereas in the water cooled PWR nuclear reactor 50A the heat exchanger 74 is completely below the water level. A further difference is that the vent pipes 93 in the water cooled PWR nuclear reactor 50A with integral pressuriser 94A protrude into the primary circuit beneath the casing 70. The vent pipes are labelled 108,110,112 and 90 in FIG. 2B. The vent pipes 108,110 and 112 are of differing lengths and diameters and interconnect the steam space 102 of the pressuriser 94B with an upper portion of the primary coolant circuit, as shown the vent pipes extend into the heat exchanger region 74 but could equally well extend into the riser region 64. The vent pipes 108,110 and 112 extend to different depths into the heat exchanger 74 region or riser 64 of the primary coolant circuit, for reasons discussed later, but each one rises to the same elevation in the pressuriser 94B steam space 102. A small diameter vent pipe 90 extends from the casing 70 to the pressuriser 94B steam space 102 for the passage of incondensibles from the primary water coolant circuit steam space 82 to the pressuriser steam space 102.

In the water cooled BWR nuclear reactor the annular member 91 of the casing 70 extends downwards to a position below the normal effective water level 86 in the primary circuit.

The water cooled BWR nuclear reactor 50B with integral pressuriser 94B shown in FIG. 2B is not provided with pumps in the downcomer passage 81. However if there is insufficient natural circulation in the primary coolant circuit pumps may be provided to augment the natural circulation.

In operation of the water cooled nuclear reactors 50A and 50B the fission of nuclear fuel in the reactor core 54 produces heat. The heat is carried away from the reactor core 54 by the primary water coolant circuit. The heating of the water in the vicinity of the reactor core 54 causes the water to flow in an upwards direction as shown by arrows D through the riser passage 64, the primary water then flows through the flow distribution apertures 66 in the cylindrical member 62 and into in the steam generator 74 cavity to pass over the steam generator tubes as shown by arrows E. The primary water gives heat to the secondary water in the steam tubes on passing through the steam generator 74. The primary water then returns to the reactor core 54 through the annular downcomer passage 81 as shown by arrow F.

The function of the integral pressurisers 94A and 94B of the water cooled PWR nuclear reactor 50A and water cooled BWR nuclear reactor 50B respectively is to control the primary water coolant circuit pressure during steady state and transient conditions, to act as a surge tank for transient variations in the primary water coolant circuit inventory during normal and upset conditions, to vent excessive vapour from the primary water coolant circuit and to provide a secure reserve supply of coolant to the primary water coolant circuit automatically by gravity drain under accident conditions.

In addition for the water cooled BWR nuclear reactor 50B the pressuriser 94B also regulates the effective water level in primary water coolant circuit side of the heat exchanger and hence controls the amount of boiling in the reactor core during normal operation.

The casing 70 prevents the water coolant in the primary water coolant circuit from mixing with the water coolant in the pressuriser water space 104, and hence prevents interference with the performance of the pressurisers. In steady state operation, conditions in the pressurisers are essentially stagnant. Fluid communication between the primary water coolant circuit and the pressuriser occurs during transient conditions via the surge port 98 and annular passage 92 or the vent pipes 93 or vent pipes 90, 108,110, and 112.

In the integral water cooled PWR nuclear reactor 50A with integral pressuriser 94A the temperature in the water space 104 of the pressuriser 94 is maintained at a higher level than that at the reactor core 54 exit by means of the electrical immersion heaters 95. Under steady state conditions thermodynamic equilibrium prevails across the steam/water interface or water level 106 of the pressuriser 94A and the primary pressure is the saturation pressure corresponding to the temperature at the water level 106. This is substantially higher than the saturation pressure corresponding to the bulk core outlet temperature.

In the integral water cooled BWR nuclear reactor 50B with integral pressuriser 94B the system pressure is essentially the saturation pressure corresponding to the bulk coolant temperature at the outlet from the reactor core 54. Because of its higher elevation and because of heat losses from the steam space 102 to the surroundings, conditions in the pressuriser of 94B of the integral BWR will be at a slightly lower pressure and slightly lower temperature than in the primary water coolant circuit. However, saturation conditions prevail there also. Under steady state conditions heat losses from the pressuriser 94B are compensated by heat transfer to the pressuriser 94B from the primary water coolant circuit across the casing 70, driven by the slight temperature difference between the saturation conditions in the pressuriser 94B and in the riser passage 64 of the primary water coolant circuit. The difference in saturation pressures corresponding to the these temperatures in the pressuriser 94B and primary water coolant circuit is sufficient to cause a vapour bubble, and hence an effective water level 86, to form in the upper region of the primary water coolant circuit beneath the casing 70. The vents 108,110,112 and 90 in FIG. 2B limit or prevent the natural tendency for any steam bubble in the primary circuit beneath the casing 70 to grow indefinitely thereby pushing an excessive volume of water from the primary circuit into the pressuriser and causing the primary circuit and core to become blanketed in steam.

An equilibrium is reached when the pressuriser water level and the effective water level in the primary circuit are separated by an elevation H, essentially given by:

$$H = \frac{dP}{dT} \frac{(T_2 - T_1)}{\rho g} - H_D$$

where $T_2$, $T_2$ = Saturation temperatures in the primary water coolant circuit and pressuriser respectively.

$\frac{dP}{dT}$ = Slope of the saturation curve for water in the vicinity of $T_2$ and $T_1$.

$\rho$ = Mean density of the water in the pressuriser and surge annulus.

g Acceleration due to gravity.

$H_D$ = Head loss due to flow in the downcomer between the effective steam generator water level and the surge port 98 elevation.

Only a small temperature difference ($T_2 - T_1$) is required to produce a large value of H.

The vents 108, 110, 112 regulate the effective water level 86 in the primary water coolant circuit riser and steam generator cavity as follows. Vents 110, 112 which protrude beneath the effective water level 86 in the steam generator region are maintained full of water by the difference in pressure between the pressuriser 94B and the primary water coolant circuit. The water column in such flooded vents extends to an elevation Hv greater than the pressuriser water level by an amount $H_V = H_D$ equal to the head loss due to flow in the downcomer 81 between the effective steam generator water level 86 and the surge port 98 elevation.

The vents 108, 110 and 112 must protrude into the pressuriser steam space 102 by at least this amount. Thus to minimise the length of the vents the surge port 98 is located at the highest practical elevation below the effective water level 86 in the steam generator region to minimise the downcomer 81 head loss component $H_D$. Under steady state conditions flow of coolant through such flooded vents is precluded. Vents which terminate above the effective water level 86 in the steam generator region are empty of water, and vapour in the primary water coolant circuit can flow into the pressuriser 94B steam space 102 under the action of the difference in pressure between the primary water coolant circuit and the pressuriser 94B. This flow of vapour, and enthalpy, increases the pressure and temperature in the pressuriser 94B with a resultant tendency to push water from the pressuriser 94B into the primary water coolant circuit via the annular passage 92 and surge ports 98 to increase the effective water level 86 in the primary water coolant circuit until the vent is covered or until an equilibrium water level is reached when the mass flows through the uncovered vents and surge ports 98 are balanced and the concomitant enthalpy flows and other pressuriser heat losses and gains are also balanced. The vents are sized in length, diameter, i.e. flow capacity, and in number to control the effective water level 86 in the steam generator region at an appropriate steady state level with the desired amount of intrinsic negative feedback during transients. The energy balance on the pressuriser 94B may be augmented by suitable immersion heater capacity in the pressuriser 94B water space 104 and by suitable heat removal systems in the pressuriser 94B steam space 102 for supplementary control of effective water levels 86 in the primary water coolant circuit.

In the integral water cooled BWR nuclear reactor 50B with integral pressuriser 94B the vents protrude into the steam generator region of the primary water coolant circuit to control the effective primary water level 86 at an elevation lower than the top of the steam generator to promote condensing heat transfer from the primary coolant to the secondary coolant and hence bulk boiling in the reactor core 54.

In the integral water cooled PWR nuclear reactor 50A, with integral pressuriser 94A a water level is prevented from forming in the primary water coolant circuit by maintaining the pressuriser 94A at a higher temperature than that at the core exit, as described earlier. In this case the vents 93 need not protrude into the steam generator region. They terminate where they enter the casing 70. In the integral PWR the vents 93 are sized to provide a means of venting vapour from the primary water coolant circuit under all accident conditions likely to be encountered.

In this safety function the vents 93 prevent the primary water coolant circuit and reactor core 54 from becoming steam blanketed in the event that the pressuriser 94A heaters fail to maintain a sufficient overpressure to prevent substantial void formation in the primary water coolant in the primary water circuit. Loss of pressuriser heaters 95, excessive steam generator secondary feed water supply, secondary steam pipe rupture or other excessive secondary steam demands, loss of primary water coolant circuit pressure due to primary water coolant leaks, and excessive primary to secondary power imbalance are accident conditions which may result in void formation in the primary water coolant circuit which the vents 93 are designed to protect against.

The vents 93 release such voidage and prevent primary coolant water being forced out of the primary water coolant circuit into the pressuriser water space 104 by the natural tendency for a vapour bubble to expand leading to the possible steam blanketing of the primary circuit and core 54, a characteristic of prior art pressuriser systems which exacerbates the accident conditions and impairs the ability of the primary water coolant circuit to maintain core cooling during severe accidents. The vents 93 facilitate the draining of water from the pressuriser to the primary water coolant circuit through the annular passage 92 and surge ports 98 to maintain core cooling under the action of gravity immediately and continuously as such accidents start and develop. This may preclude reactor core 54 damage during the time period before engineered safety systems can be brought into effect. To effect this safety function the pressuriser water space 104 may be designed to carry a sufficiently large reserve capacity of primary water coolant. Provision may be made for controlled depressurisation of the primary water coolant circuit during some accident conditions by venting steam in the pressuriser steam space 102 and for additional primary water coolant make up supplies to the pressuriser water space 104 or to the downcomer of the primary circuit to effect long term bleed and feed cooling of the reactor core 54 in accident conditions.

The vents 108, 110, 112 in the integral water cooled BWR nuclear reactor 50B with integral pressuriser also have a similar safety function as in the integral PWR variant. However, in this case the deepest vents are sized to prevent vapour blanketing of the primary water coolant circuit and reactor core 54 during all accident conditions and must protrude below the range of water levels encountered during normal operation. The surge ports 98 and the annular passage 92 between the casing 70 and the pressure vessel 52 may be designed to serve this purpose by terminating them at an appropriately high elevation below the normal range of water levels 86. Again the pressuriser 94B doubles as a reserve primary water coolant supply under accident conditions.

In the integral water cooled BWR nuclear reactor 50B with integral pressuriser 94B one small vent 90 is provided from the top of the primary water coolant circuit to the pressuriser steam space 102 to vent any incondensible gases which may otherwise accumulate in the steam generator cavity and impede condensation heat transfer.

A further function of the vents 93 in the PWR case, or 108,110,112 in the BWR case is to provide a desuperheating spray of subcooled water into the pressuriser steam space 102 during rapid surges of primary water coolant from the primary water coolant circuit to the pressuriser 94B. Flow of water from the primary water coolant circuit to the pressuriser 94B steam space 102 is facilitated by endowing the alternative flow path via the surge ports 98 and annular passage 92 with a relatively high resistance to flow from the primary water coolant circuit to the pressuriser water space 102. This may be effected by hydraulic diodes in the annular passage 92. A rapid flow of water into the water space 104 of the pressuriser 94B results in a piston-like compression of the pressuriser steam space 102 by the rising water level 106. Surge flow diverted through the vents 93 or 108,110,112 lessens the piston effect and facilitates desuperheating of the steam space 102 by mixing. To facilitate mixing of the surge flow from the vents into the steam space the vents may be fitted with spray nozzles. This arrangement effectively taps the power imbalance during a positive primary coolant volume surge to drive the desuperheating spray flow through the vents 93 or 108,110,112 to the pressuriser steam space.

The annular passage 92 and surge ports 98 have a low resistance to flow of water from the pressuriser water space 104 to the primary water coolant circuit. This facilitates augmentation of the primary water coolant inventory during negative volume surges accompanying transient reductions in primary water coolant circuit temperature or transient increases in primary water coolant circuit effective water level.

A low flow resistance also facilitates gravity draining of water coolant from the water space 104 of the pressuriser into the primary water coolant circuit during accident conditions.

Figure 3:
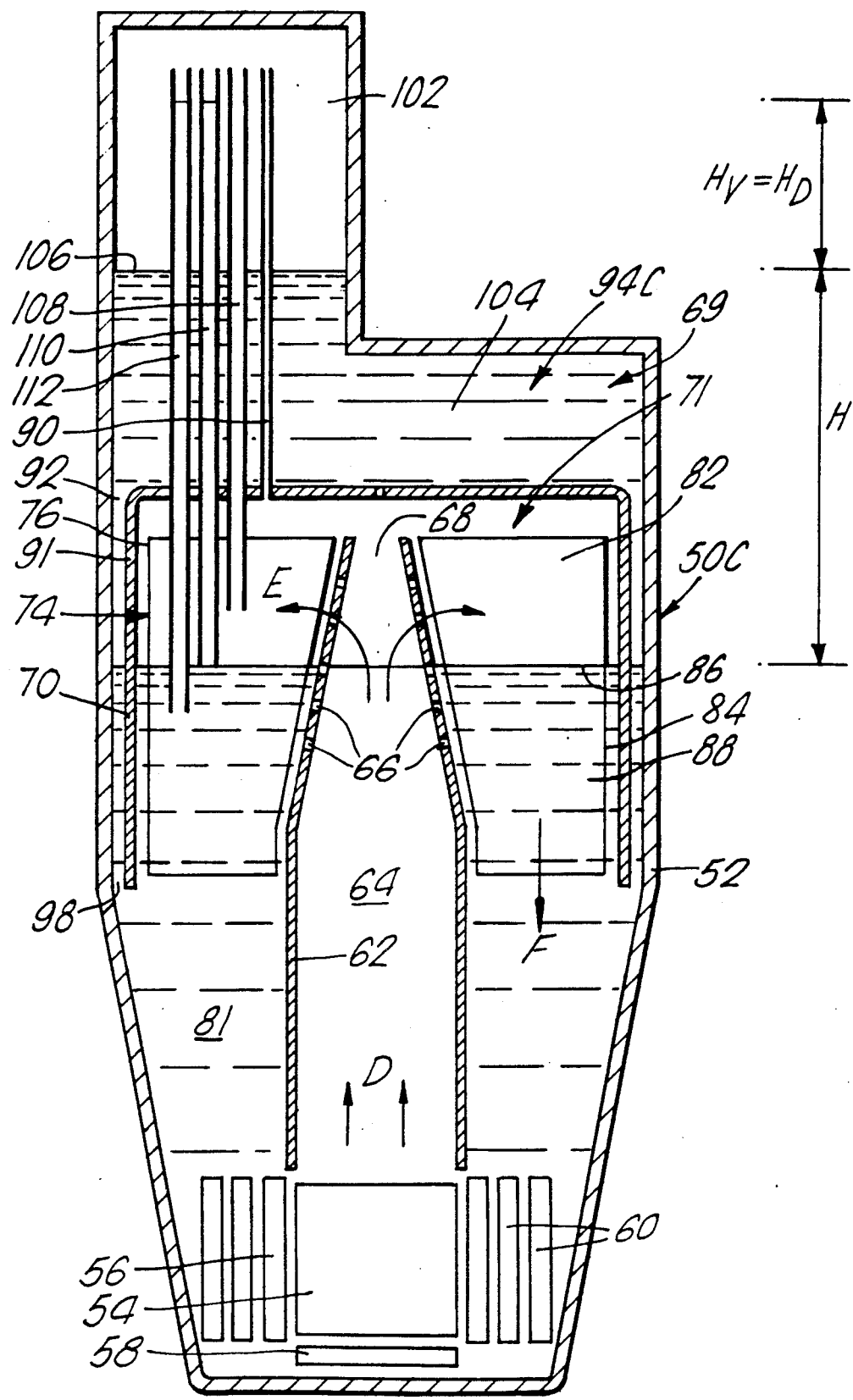
FIG. 3 is a vertical cross-sectional diagrammatical view of a third embodiment of a water cooled nuclear reactor with integral pressuriser according to the present invention.
Figure 4:
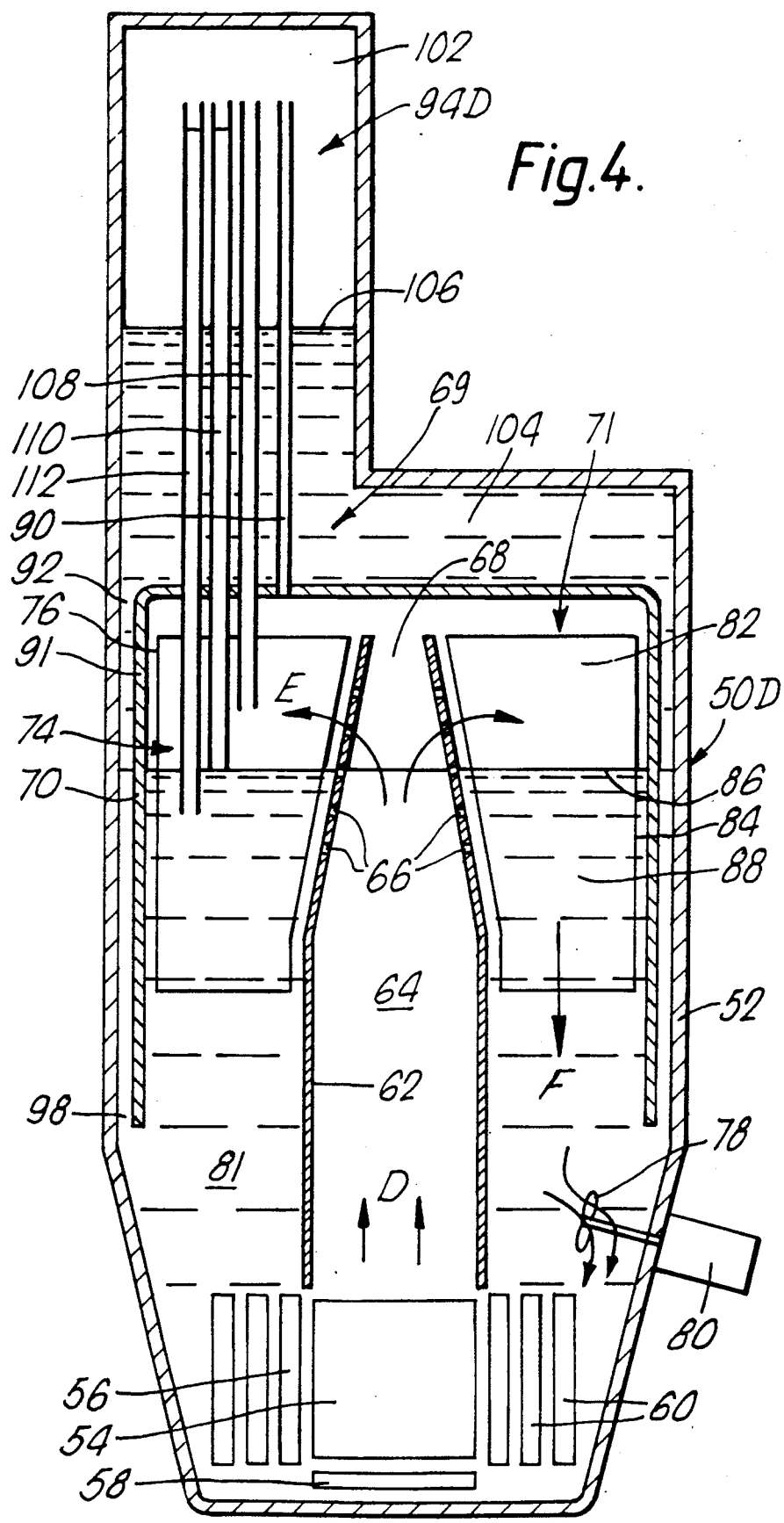
FIG. 4 is a vertical cross-sectional diagrammatical view of a fourth embodiment of a water cooled nuclear reactor with integral pressuriser according to the present invention.
Figure 5:
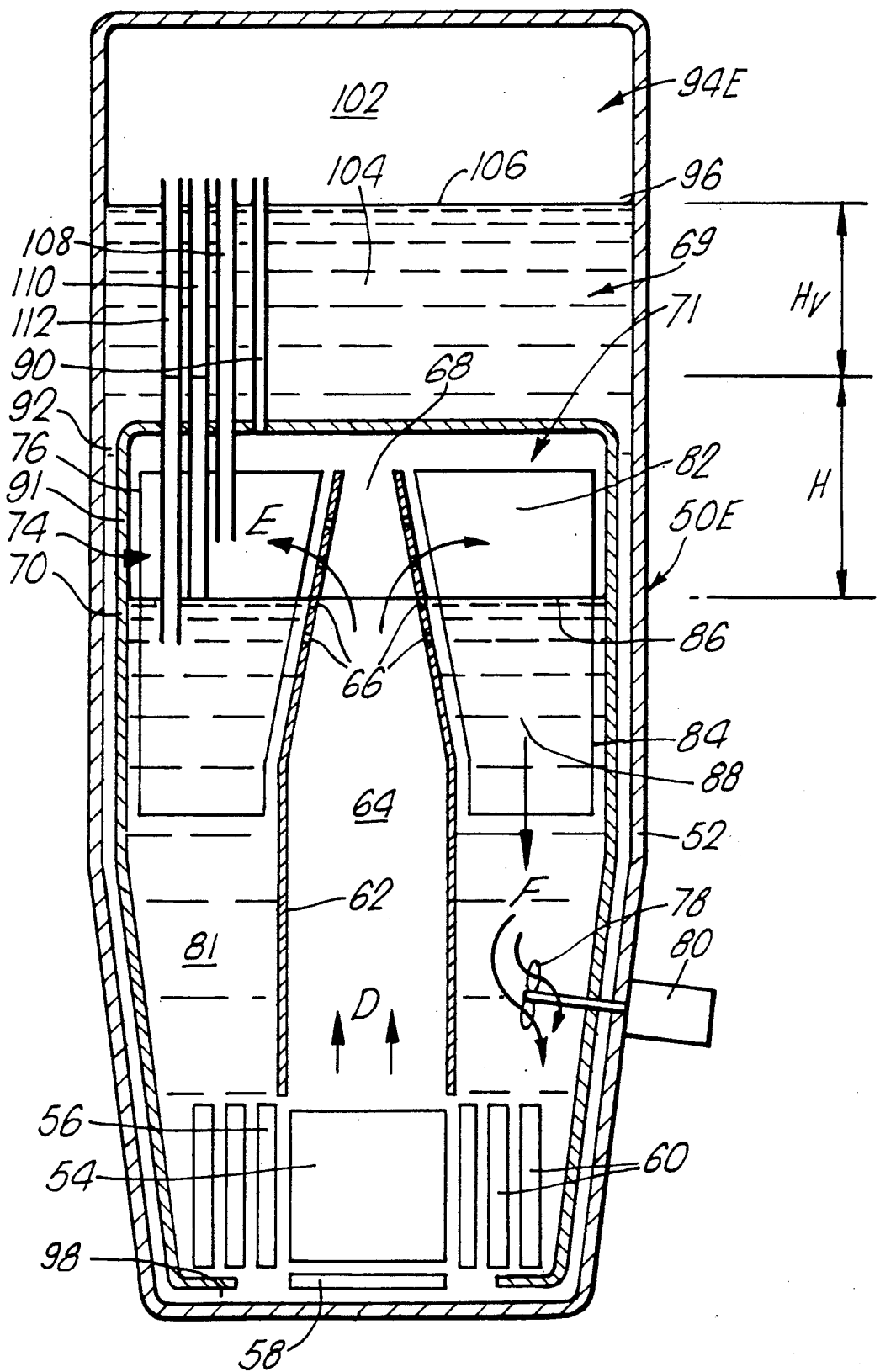
FIG. 5 is a vertical cross-sectional diagrammatical view of a fifth embodiment of a water cooled nuclear reactor with integral pressuriser according to the present invention.

FIGS. 3,4 and 5 show further embodiments of water cooled indirect cycle BWR nuclear reactor 50C,50D, and 50E with integral pressurisers. FIGS. 3,4 and 5 could equally apply to integral PWR variants with immersion heaters in the water spacers 102 of their integral pressurisers 94C,D and E to maintain the pressure well above that core 54 outlet saturation conditions. These three embodiments are substantially the same as the embodiment shown in FIG. 2B, but differ in that the annular member 91 of the casing 70 extends into the annular downcomer passage 81 below the heat exchanger 74. In FIG. 3, the annular member 91 terminates at the bottom of the heat exchanger 74, in FIG. 4, the annular member 91 terminates between the heat exchanger 74 and the thermal shields 60, and in FIG. 5, the annular member 91 terminates below the thermal shields 60.

A further difference, in FIGS. 3 and 4 is that the vents 108,110 and 112 are longer to allow for the greater elevation $H_v$ of the standing water columns in the flooded vents 110 and 112 and the pressure vessel 52 is increased in height to accommodate the longer vents 108,110 and 112.

In FIG. 5, the surge ports 98 at the downstream end of the annular member 91 enter the primary water coolant circuit downstream of the pumps 78. The separation between the water levels in the pressuriser 94B and primary water coolant circuit is given by:

$$H = \frac{dP}{dT} \frac{(T_2 - T_1)}{\rho g} - H_D + H_P$$

where $H_P$ is the pump head.

The water level in the flooded vents 108,110 and 112 differs from the pressuriser water level 106 by an amount $H_V = H_D - H_P$. Thus the water in the vents 108,110 and 112 is drawn below the pressuriser water level.

Figure 6:
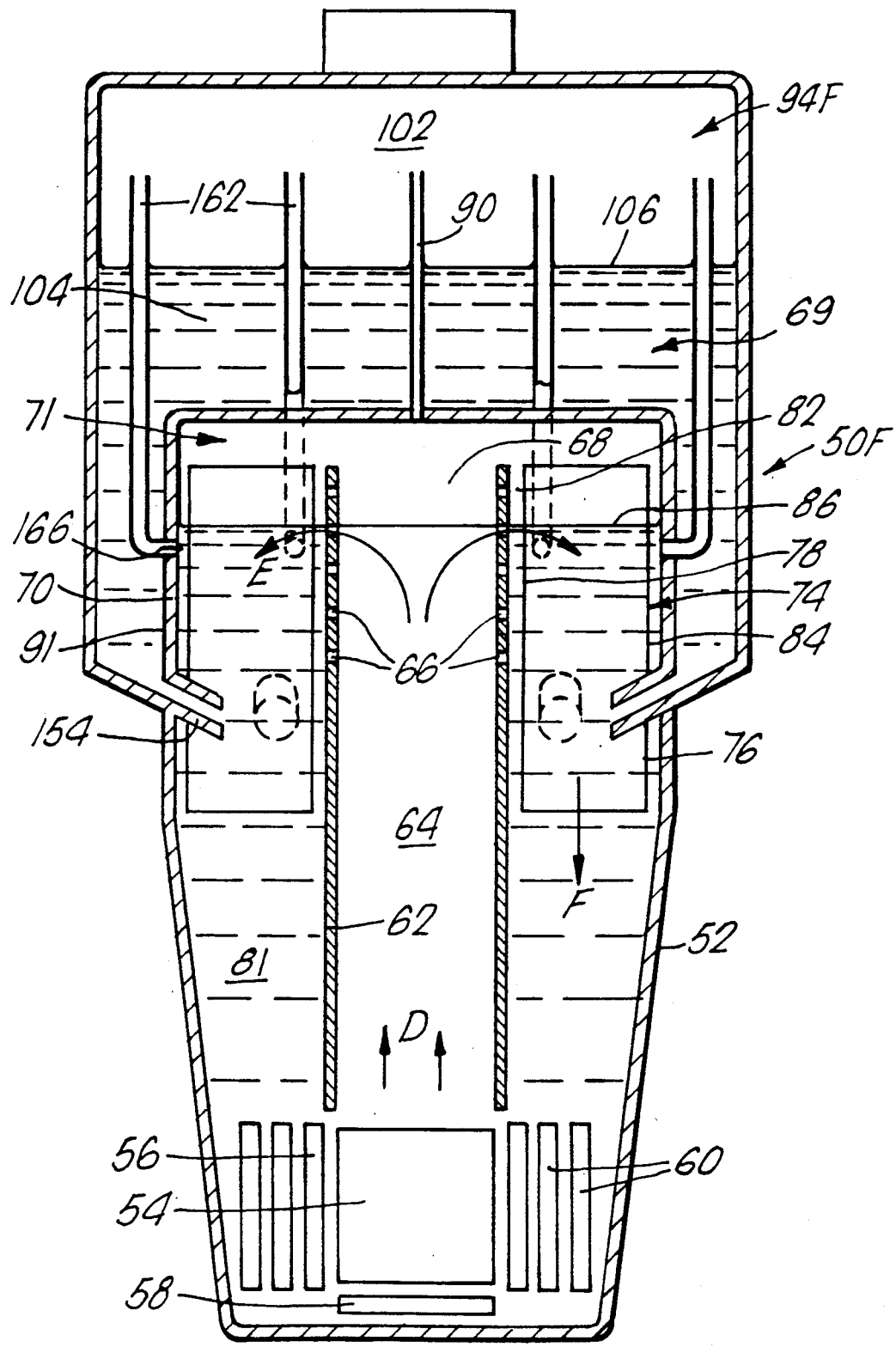
FIG. 6 is a vertical cross-sectional diagrammatical view of a sixth embodiment of a water cooled nuclear reactor with integral pressuriser according to the present invention.

A further embodiment of a water cooled nuclear reactor 50F with integral pressuriser 94F according to the present invention is shown in FIG. 6. This is an indirect cycle boiling water reactor although it is applicable to a pressurised water type. The water cooled nuclear reactor 50F again comprises a pressure vessel 52 within which is positioned a reactor core 54. The reactor core 54 is positioned at the lower region of the pressure vessel 52. The reactor core 54 includes a system of movable neutron absorbing control rods linked to drive mechanisms (not shown). The reactor core 54 is surrounded by a neutron reflector 56. A thermal shield 58 is positioned below the reactor core 54 and thermal shields 60 are positioned so as to surround the neutron reflector 56. The thermal shields 58 and 60 protect the pressure vessel 52 from radiation emanating from the reactor core 54.

A primary water coolant circuit is used to cool the reactor core 54, and the primary water coolant circuit uses a natural circulating arrangement. Pumps (not shown) may be provided in the downcomer 81 or beneath the thermal shields 60 to enhance the flow of coolant through the reactor core 54. The primary water coolant circuit comprises a hollow cylindrical member 62 which is aligned with and positioned vertically above the reactor core 54 to define a riser passage 64 therein for the natural vertically upward flow of relatively hot primary coolant from the reactor core 54, and an annular downcomer passage 81 is defined with the pressure vessel 52 for the natural vertically downward return flow of relatively cool primary coolant to the reactor core 54.

A casing 70 is positioned in the pressure vessel 52, and divides the pressure vessel 52 into a first vertically upper chamber 69 and a second vertically lower chamber 71. The reactor core 54 and the primary coolant circuit are arranged in the lower chamber 71.

The cylindrical member 62 extends towards but is spaced from the top of the lower chamber 71 defined by the casing 70, and the upper region of the cylindrical member 62 is provided with apertures 66 for the distribution of flow of the primary water coolant from the riser passage 64 to a heat exchanger 74 in the annular downcomer passage 81. The upper end of the cylindrical member 62 has a large aperture 68 which connects the riser passage 64 to a steam space 82 formed in the upper region of the lower chamber 71 defined by the casing 70 and the pressure vessel 52.

A secondary coolant circuit takes heat from the primary water coolant circuit. The secondary coolant circuit comprises a heat exchanger 74 i.e. a steam generator 74 which is annular and positioned coaxially in the upper region of the annular downcomer passage 81. The steam generator 74 comprises one or more steam tubes, which are arranged in the annular cavity 76, and which receive water from a supply of water via a supply pipe and inlet header, and which supply steam to a steam turbine via an outlet header and a supply pipe (not shown). A steam space 82 is formed above the water level 86 and a water space 84 is formed below the water level 86 in the steam generator 74.

The casing 70 has one or more vents 90 for incondensibles at its highest point, and the casing 70 has an annular member 91 which extends vertically downwards from the peripheral region of the casing 70. The bottom region of the annular member 91 is secured and sealed to the pressure vessel 52. The annular member 91 extends downwards to a position below the normal water level 86 in the steam generator 74 region.

The pressuriser 94F is positioned within the pressure vessel 52 in the vertically upper chamber 69 formed between the casing 70 and the pressure vessel 52. The pressuriser or surge tank which contains water and steam is defined by the pressure vessel 52, the casing 70 and the annular member 91, and a water space 104 is formed below the water level 106 and a steam space 102 is formed above the water level 106 of the pressuriser. The bottom region of the pressuriser is provided with a plurality of circumferentially arranged surge ports 154 which are formed in the annular member 91 of the casing 70. The surge ports 154 fluidly communicate between the pressuriser water space 104 and the annular downcomer passage 81 of the primary coolant circuit, and as shown the surge ports 154 extend into the steam generator 74 region of the primary coolant circuit. The surge ports 154 have low flow resistance for water from the surge tank to the primary coolant circuit; and have high flow resistance for water from the primary water coolant circuit to the surge tank. The surge ports 154 as shown are re-entrant nozzles, but suitable hydraulic diodes or valves could be used to perform this task.

A number of vent pipes 162 interconnect the steam space 102 of the pressuriser 94F with an upper portion of the primary coolant circuit, as shown the vent pipes 162 connect to ports 166 formed in the annular member 91 of the casing 70. The ports are circumferentially arranged and are positioned at the water level in the primary coolant circuit as shown. They determine this water level.

The water cooled nuclear reactor 50F operates substantially the same as that in FIG. 2B.

This arrangement also can be used as in the embodiment of FIG. 2A as an integral pressurised water reactor.

Figure 7:
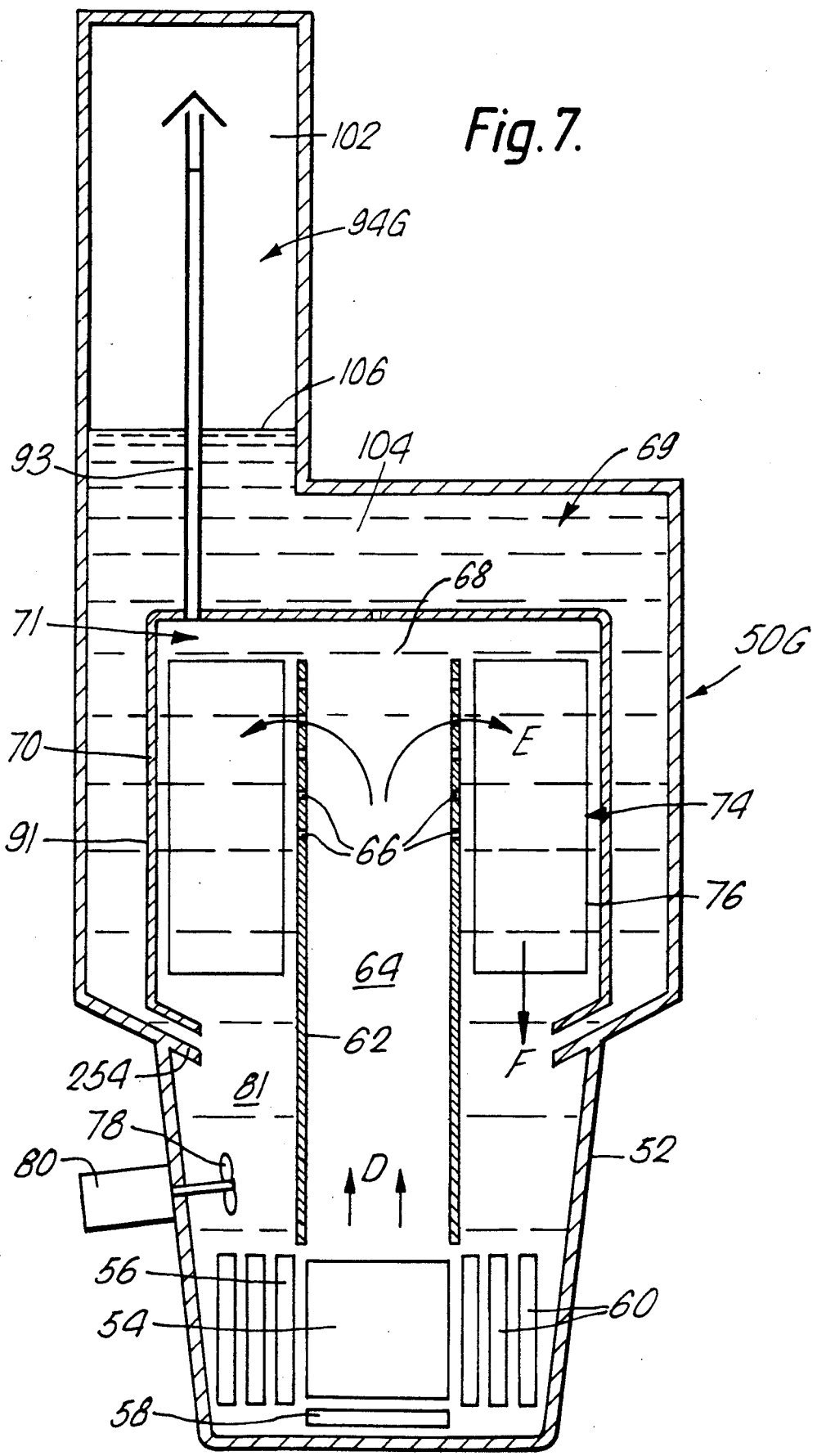
FIG. 7 is a vertical cross-sectional diagrammatical view of a seventh embodiment of a water cooled nuclear reactor with integral pressuriser according to the present invention.

The embodiment shown in FIG. 7 is a water cooled PWR nuclear reactor 50G with integral pressuriser and is substantially the same as the embodiment in FIG. 2A, but the bottom region of the annular member 91 is sealingly secured to the pressure vessel 52 and surge ports 254 are provided. The surge ports 254 extend into the downcomer passage 81 below the heat exchanger 74. The surge ports 254 are reentrant nozzles, but other suitable hydraulic diodes could be used. A single vent pipe 93 is provided which again interconnects the steam space 102 of the pressuriser 94G with the upper portion of the primary coolant circuit. The vent pipe 93 is of increased length for the same reason as the vent pipes in FIGS. 3 and 4.

This arrangement may also be used as an embodiment of an integral BWR with vents as in FIG. 5.

Figure 8:
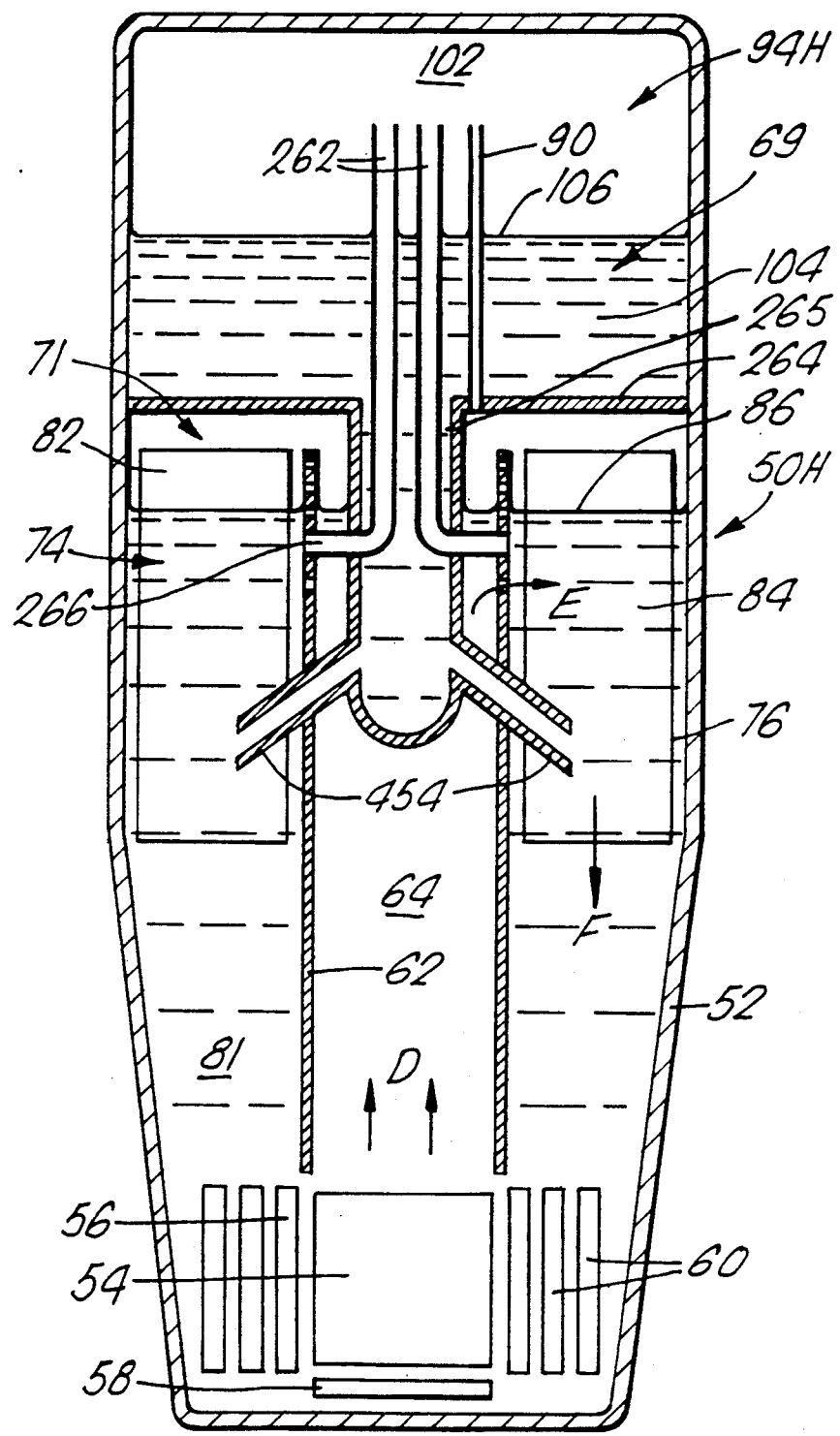
FIG. 8 is a vertical cross-sectional diagrammatical view of an eighth embodiment of a water cooled nuclear reactor with integral pressuriser according to the present invention.

A further embodiment of a water cooled nuclear reactor 50H with integral pressuriser 94H according to the present invention is shown in FIG. 8. This is an indirect cycle BWR nuclear reactor and is substantially the same as the embodiments in FIGS. 2B,3,4,5 and 6. In this example a casing 264 is secured to and seals with the pressure vessel 52 to divide the pressure vessel 52 into an upper chamber 69 and a lower chamber 71. The casing 264 has an annular member 265 which extends downwards therefrom about the axis of the pressure vessel 52, and the member 265 is closed at its bottom end. The annular member 265 extends coaxially into the cylindrical member 62 and is spaced therefrom. The pressuriser 94H is positioned within the vertically upper chamber 69, formed between the casing 264 and the pressure vessel 52.

A pressuriser or surge tank which contains water and steam is defined by the pressure vessel 52, the casing 264 and the annular member 265 and a water space 104 is formed below the water level 106 and a steam space 102 is formed above the water level 106 of the pressuriser or surge tank. The bottom region of the annular member 265 is provided with a plurality of surge ports 454 which fluidly communicate between the surge tank water space 104 and the annular downcomer passage 81 of the primary coolant circuit. The surge ports 454 extend through the cylindrical member 62, and into the steam generator 74. The surge ports 454 have low flow resistance for water from the surge tank water space to the primary coolant circuit, but have high flow resistance for water from the primary coolant circuit to the surge tank water space.

A number of vent pipes 262 interconnect the steam space 256 of the pressuriser 94H with an upper portion of the primary coolant circuit, as shown the vent pipes 262 extend through annular member 265 and connect to ports 266 formed in the cylindrical member 62. The ports 266 are circumferentially arranged and are positioned at the effective water level in the primary coolant circuit. They determine this water level.

In the arrangement the water flowing from the pressuriser water space to the steam generator cavity of primary water coolant circuit during a negative value surge is relatively hot and this enhances the thermal inertia of the plant during power demand transients cushioning the transient steam conditions experienced by the second coolant circuit. This arrangement could also be used in an embodiment of an integral PWR with vents as in FIG. 2A.

Figure 9:
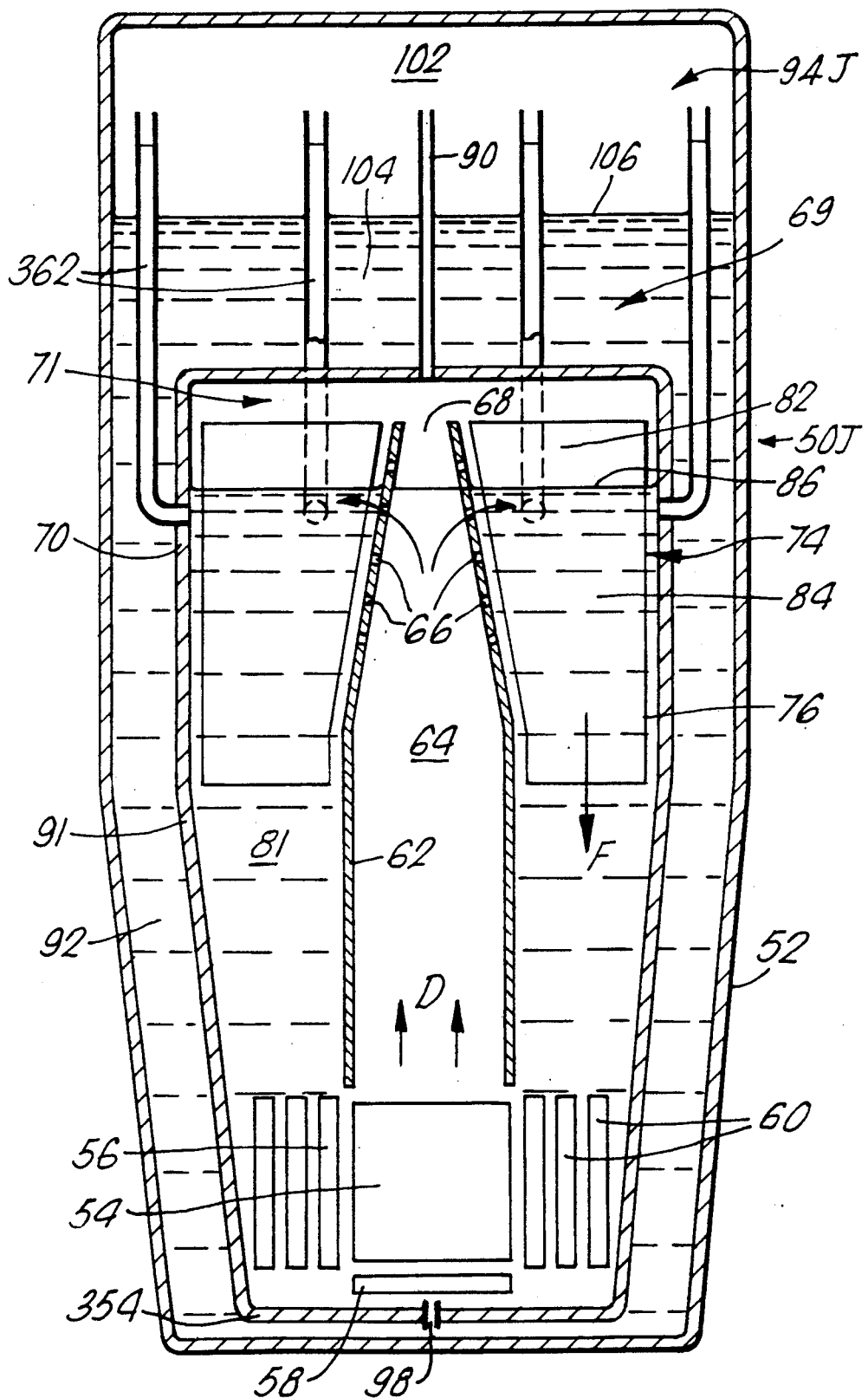
FIG. 9 is a vertical cross-sectional diagrammatical view of a ninth embodiment of a water cooled nuclear reactor with integral pressuriser according to the present invention.

The embodiment of water cooled nuclear reactor 50J with integral pressuriser 94J shown in FIG. 9, is an indirect cycle BWR nuclear reactor, and is substantially the same as the embodiment in FIG. 5, the annular member 91 of the casing 70 extends downwards below the reactor core 54 or the thermal shield 58. The casing 70 also comprises a bottom member 354 which is sealingly secured to or formed integrally with the bottom end of the annular member 91, and a surge port 98 is formed in the bottom member 354 beneath the reactor core 54. A plurality of vent pipes 362 interconnect the steam space 102 of the pressuriser 94J with the upper region of the primary water coolant circuit below the water level 86. Thus the casing 70 is completely enclosed by the pressure vessel 52, and the casing 70 divides the pressure vessel 52 into a first outer chamber 69 formed between the casing 70 and the pressure vessel 52, and a second inner chamber 71 formed within the casing 70.

The downcomer passage 81 is formed between the annular member 91 of the casing 70 and the cylindrical member 62.

The pressure vessel 52 is spaced from the annular member 91 to form an annular passage 92 which forms a lower portion of the water space 104 of the pressuriser 94J. The upper portion of the water space 104 of the pressuriser or surge tank 94J is above the casing 70.

The annular passage 92 and surge ports 98 have a low resistance to flow of water from the pressuriser water space 104 to the primary water coolant circuit. This facilitates augmentation of the primary water coolant inventory during negative volume surges accompanying transient reductions in primary water coolant circuit temperature and transient increases in primary water coolant circuit effective water level.

A low resistance also facilitates gravity draining of water coolant from the water space 104 of the pressuriser into the primary water coolant circuit during accident conditions.

A major function of the vents is to prevent steam blanketing of the primary circuit and reactor core under all circumstances and to facilitate gravity drain of the water in the pressuriser into the primary circuit and core under accident conditions resulting in severe reductions in primary coolant pressure. To facilitate this latter function the pressuriser water space may be sized to carry a large reserve of coolant which is readily and continuously available to maintain the reactor core submersed during the development of severe accidents resulting in the loss of normal cooling or a severe reduction in primary system pressure. To enhance this function the surge ports may be located beneath the reactor core as in FIG. 10. In this embodiment the primary water coolant circuit is effectively submerged in the pressuriser water space. The annular passage of the water space may contain coolers to maintain a stratified temperature distribution in the water space of the pressuriser cum surge tank. Hot water above and cooler water below.

This arrangement facilitates a rapid core response to increases in steam demand. The resultant negative volume surge draws in cool water from the pressuriser 94J leading to a rapid core response through the negative temperature coefficient of reactivity. The arrangement also enhances the gravity flow of water from the pressuriser to the core during accident conditions which may lead to void formation in the primary circuit.

This arrangement could also be used in an embodiment of the integral PWR type with vents as in FIG. 2A.

FIGS. 10A and 10B show further alternative embodiments of water cooled nuclear reactors, FIG. 10A shows an integral pressurised water reactor 50K and FIG. 10B shows an integral indirect cycle boiling water reactor 50L.

In these two embodiments the pressure vessel 52 is divided into an upper chamber 69 and a lower chamber 71 by a casing 270 which is secured to and seals with the pressure vessel 52. In the integral pressurised water reactor variant in FIG. 10A, a single vent pipe 93 extends upwards from the casing 270 and interconnects the steam space 102 of the pressuriser 94K with the upper portion of the primary coolant circuit, and one or more surge pipes 272 extend into the downcomer passage 81 below the heat exchanger 74. In the integral boiling water reactor variant in FIG. 10B vent pipes 90,108 and 110 also protrude into the stream space 102 of the pressuriser 94L at their upper ends and also protrude by differing distances into the primary coolant circuit to facilitate the primary coolant circuit level regulation in the condensing steam generator, and one or more surge pipes 272 extend into the downcomer passage 81 below the heat exchanger 74.

In both these variants the surge pipes may be fitted with hydraulic diodes to facilitate a desuperheating spray of primary coolant through the vent pipes into the pressuriser steam space during a load reducing transient, under the driving action of the primary coolant circuit volume surge caused by the transient imbalance of power between the reactor and steam generator which occurs during such transients.

In the integral BWR variant, the surge pipes 272 must extend downwards to an elevation lower than the normal operating effective primary coolant circuit water level. But in the integral PWR variant, such a requirement does not apply, as the casing 270 normally defines the water level, however it may be desirable to allow the vent pipes to extend a small distance below the casing 270 to prevent any tendency for steam from the pressuriser 94K steam space 102 to be drawn down the vent pipes 93 into the primary water coolant circuit by the negative volume surge accompanying a power increasing transient.

An essential difference between the integral PWR and BWR variant is that the former has electric immersion heating capacity in the pressuriser water space 104 which maintains saturation conditions in the pressuriser substantially higher than that corresponding to the reactor core outlet temperature, while in the latter the converse applies.

The vent pipes 93,108,110 perform the multiple functions of pressuriser spray, pressuriser stabilisation, i.e. vapour venting of the primary coolant circuit during accidents and primary coolant circuit water level control, i.e. for the BWR variant only.

The pressuriser spray function may be provided separately with separate vents to provide the other functions.

Figure 10C:
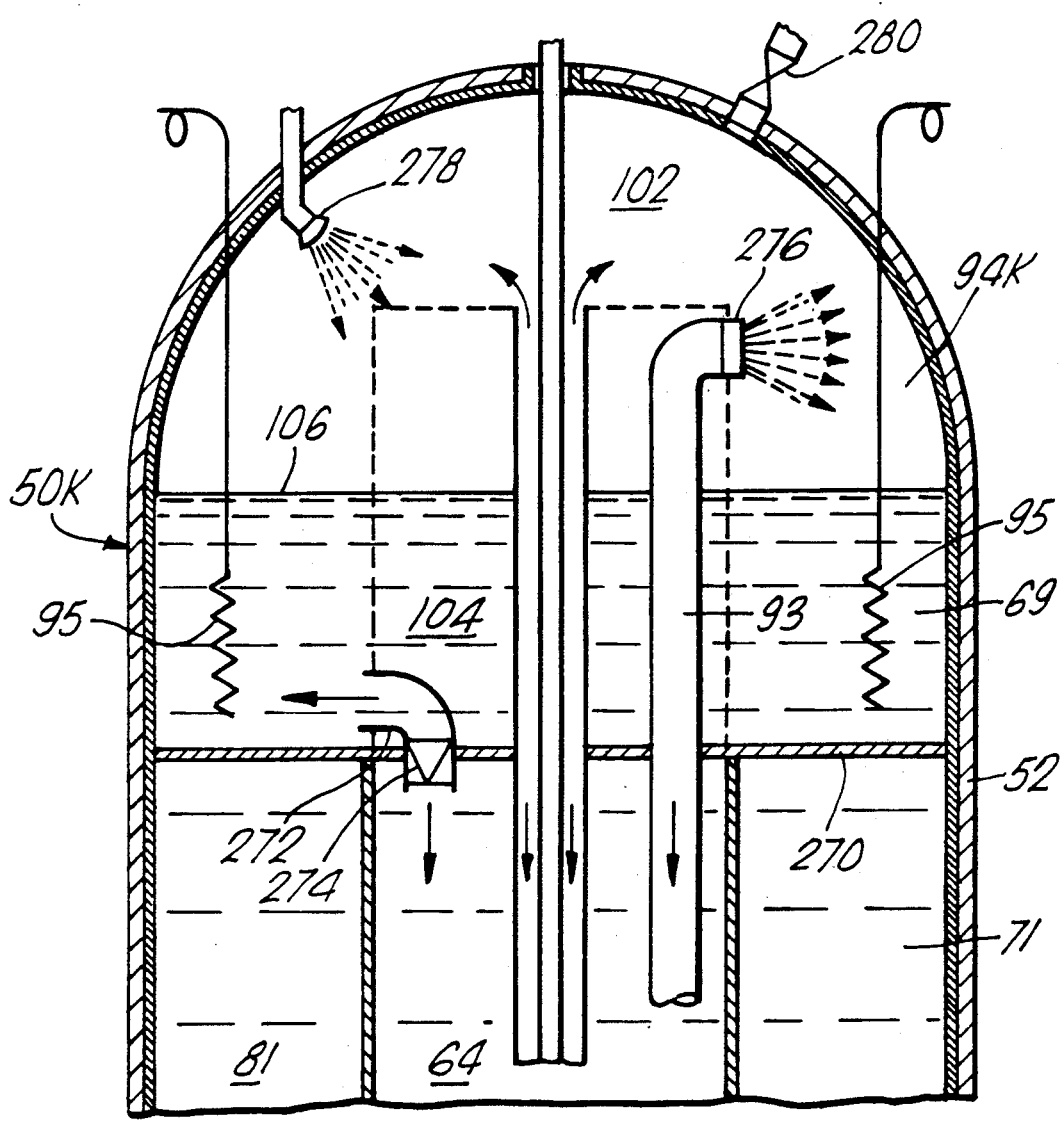
FIG. 10C is a vertical cross-sectional diagrammatical view of pressuriser for a water cooled nuclear reactor with integral pressuriser according to the present invention.

FIG. 10C illustrates the pressuriser spray function of an integral PWR 50K The surge pipes 272 are provided with a hydraulic diode 274 to interconnect the water space 104 of the pressuriser 94K and the riser 64 of the primary coolant circuit. One or more of the vent pipes 93 are provided with a spray nozzle 276, and an auxiliary conventional spray nozzle 278 is also provided in the pressuriser 94K.

During a positive volume surge, occasioned by load rejection say, primary coolant water from the primary coolant circuit is forced into the pressuriser 94K through the surge pipe 272, control rod guide tubes and the vent pipes 93. Flow restrictions in the control rod guide tubes and the hydraulic diode 274 in the surge pipe 272 limit the flow through these paths, the bulk of the volume surge thus flows through the vent pipes 93 and spray nozzle 276 to facilitate the spray function. During a negative volume surge occasioned by a power increasing transient, water flows from the pressuriser 94K water space 104 into the primary coolant circuit through the surge pipes 272 and hydraulic diodes 274 which offer a low resistance to flow in this direction. Some water may also flow down the control rod guide tubes. Any tendency for steam to be drawn down the vent pipe 93 is offset by allowing the vent pipe 93 to protrude some distance below the casing 270 into the primary coolant circuit.

In the case of an integral PWR having reactor primary coolant pumps to provide forced circulation of the primary coolant circuit it may be necessary to adjust the relative positions of the surge pipes and vent pipes in the primary coolant circuit. This is because some arrangements may result in a component, i.e. pump, steam generator or core, pressure drop between the surge pipe and vent pipe connections in the primary coolant circuit and a resulting tendency for an unwanted primary coolant flow through the vent pipes/spray pipes, pressuriser and surge pipes during normal steady state operation of the plant.

In FIG. 10C such a flow is prevented by locating both the surge pipe and vent pipe/spray pipe connections to the primary coolant circuit in the riser. However the spray function may also be provided by locating the surge pipes and vent pipes/spray pipes connections to the primary coolant circuit in the downcomer above or within the steam generator.

Figure 11A:
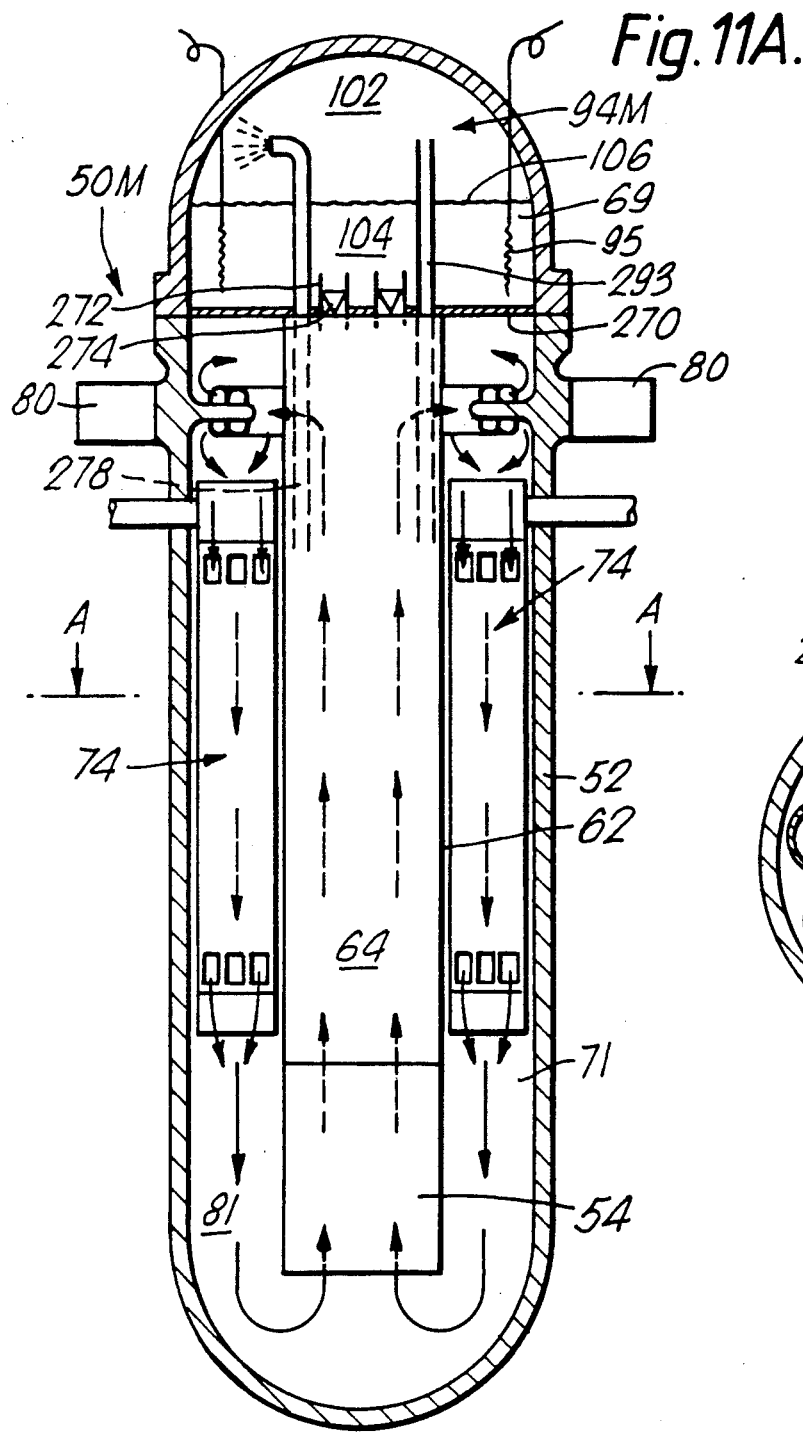
FIG. 11A is a vertical cross-sectional diagrammatical view of a twelfth embodiment of a water cooled nuclear reactor with integral pressuriser according to the present invention.
Figure 11B:
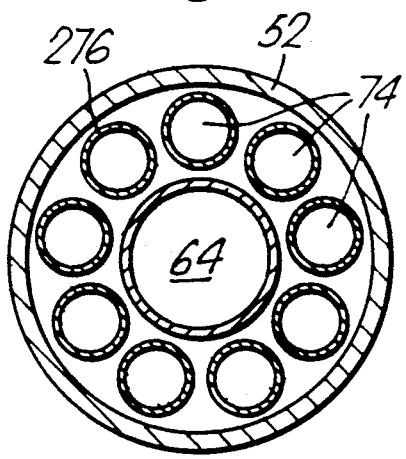
FIG. 11B is a cross-sectional view in the direction of arrows A—A in FIG. 11A.

FIG. 11A,11B,11C, and 11D show further embodiments of an integral PWR and integral indirect cycle BWR. In FIGS. 11A and 11B a number of circumferentially spaced once through steam generator modules 74 are located in an annulus formed by the hollow cylindrical member 62 and the pressure vessel 52. The steam generator modules 74 comprise a number of steam generator tubes which extend through an annular shroud 276. These shrouds 276 are interconnected at their upper ends, and are secured and sealed to the pressure vessel 52 and the hollow cylindrical member 62 to prevent the flow of primary coolant through the interstitial regions of the downcomer 81 between the steam generator 74 shrouds 276. Thus the primary coolant flows through the shrouds 276 to facilitate effective primary coolant flow distribution through the steam generator modules 74. Reactor coolant pumps 80 are located at the top of the downcomer 81 above, upstream, of the steam generators.

A number of surge pipes 272 with hydraulic diodes 274 are provided to interconnect the water space 104 of the pressurizer 94M with the primary coolant circuit. One or more spray pipes 278 communicate between the riser 64 of the primary coolant circuit and the steam space 102 of the pressurizer 94M and one or more vent pipes 93 communicate between the riser 64 and the steam space 102 of the pressuriser 94M.

Figure 11C:
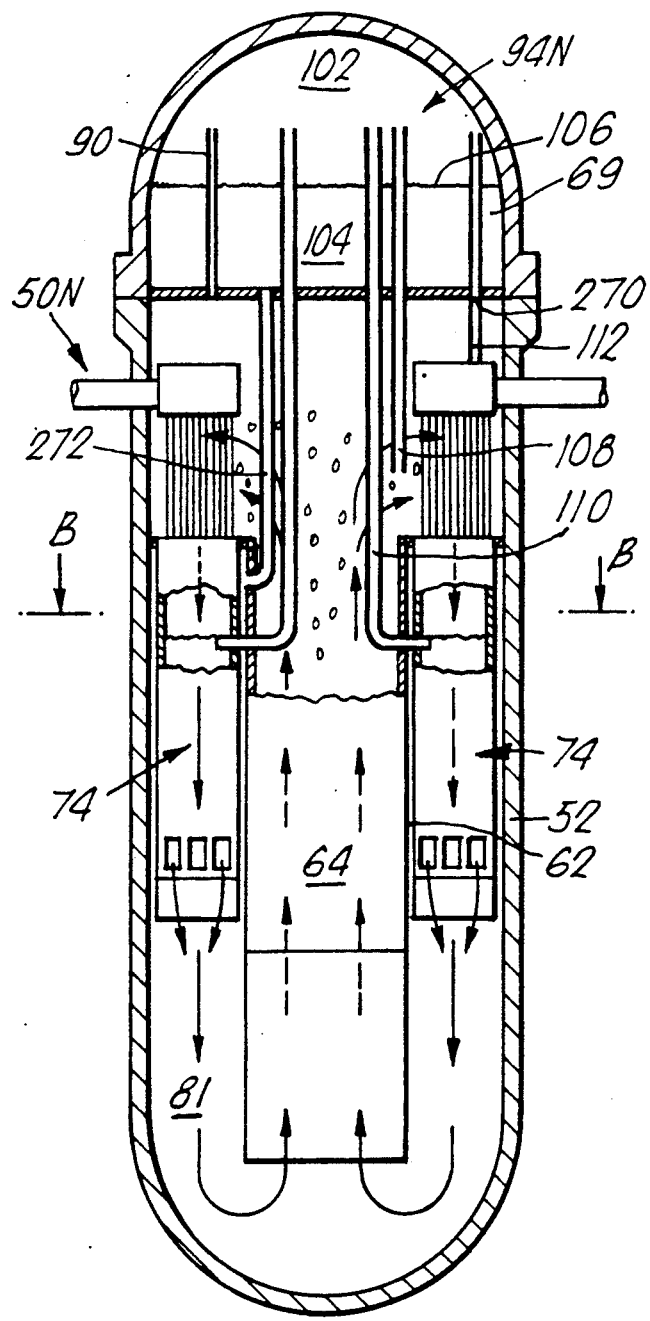
FIG. 11C is a vertical cross-sectional diagrammatical view of a thirteenth embodiment of a water cooled nuclear reactor with integral pressuriser according to the present invention.
Figure 11D:
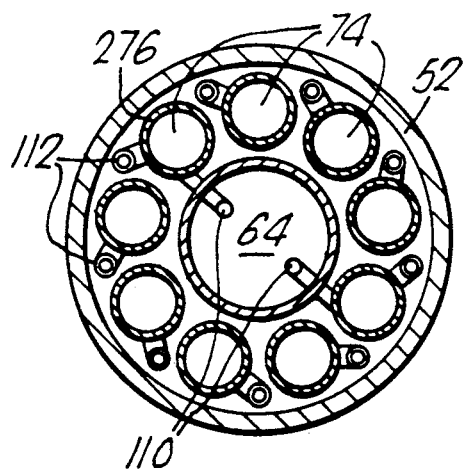
FIG. 11D is a cross-sectional view in the direction of arrows B—B in FIG. 11C.

FIGS. 11C and 11D illustrate the integral indirect cycle BWR variant of the embodiment in FIGS. 11A and 11B. This also has the steam generator molecules 74 arranged in shrouds 276 between the pressure vessel 52 and the hollow cylindrical member 62. Reactor coolant pumps are dispensed with in this variant, primarily primary coolant circuit flow being induced entirely by natural convection.

One or more surge pipes 272 communicate between the water space 104 of the pressuriser 94N and the interstitial regions of the downcomer between the steam generator modules 74, the interstitial region effectively forming part of the surge pipe. A number of primary coolant circuit water level control vent pipes 108,110,112 are provided, and an incondensible vent 90. The vent pipes 110 descend through the riser 64 and penetrates through the hollow cylindrical member 62 and the shrouds 276 to effect primary coolant circuit water level control at this elevation during say high power operation. The vents 112 descend through the interstitial region and penetrate the shrouds 276. The vent 108 terminates in the common plenum region above the shrouds 276 to control the primary coolant circuit water level at a higher elevation at low power operation.

An advantage of an integral arrangement of water cooled nuclear reactor is that a propensity exists for the coolant to circulate around the primary circuit and through the core by natural convection. This is a desirable safety characteristic which may be used during power operation in some circumstances. The presence of voidage in the riser due to condensing heat transfer in the steam generator particularly enhances the propensity for natural circulation in the integral indirect cycle BWR variant. Thus reactor circulation pumps may not be needed for some designs of this variant. However, provision for reactor circulation pumps in the downcomer or beneath the thermal shields may be provided in both the BWR and PWR variants.

The main features of the present invention are the casing separating the pressuriser and the primary circuit within the same pressure vessel and the system of vents from the upper region of the primary water coolant circuit to the pressuriser steam space. The venting concept extends to the case of a separate pressuriser also.

Figure 12:
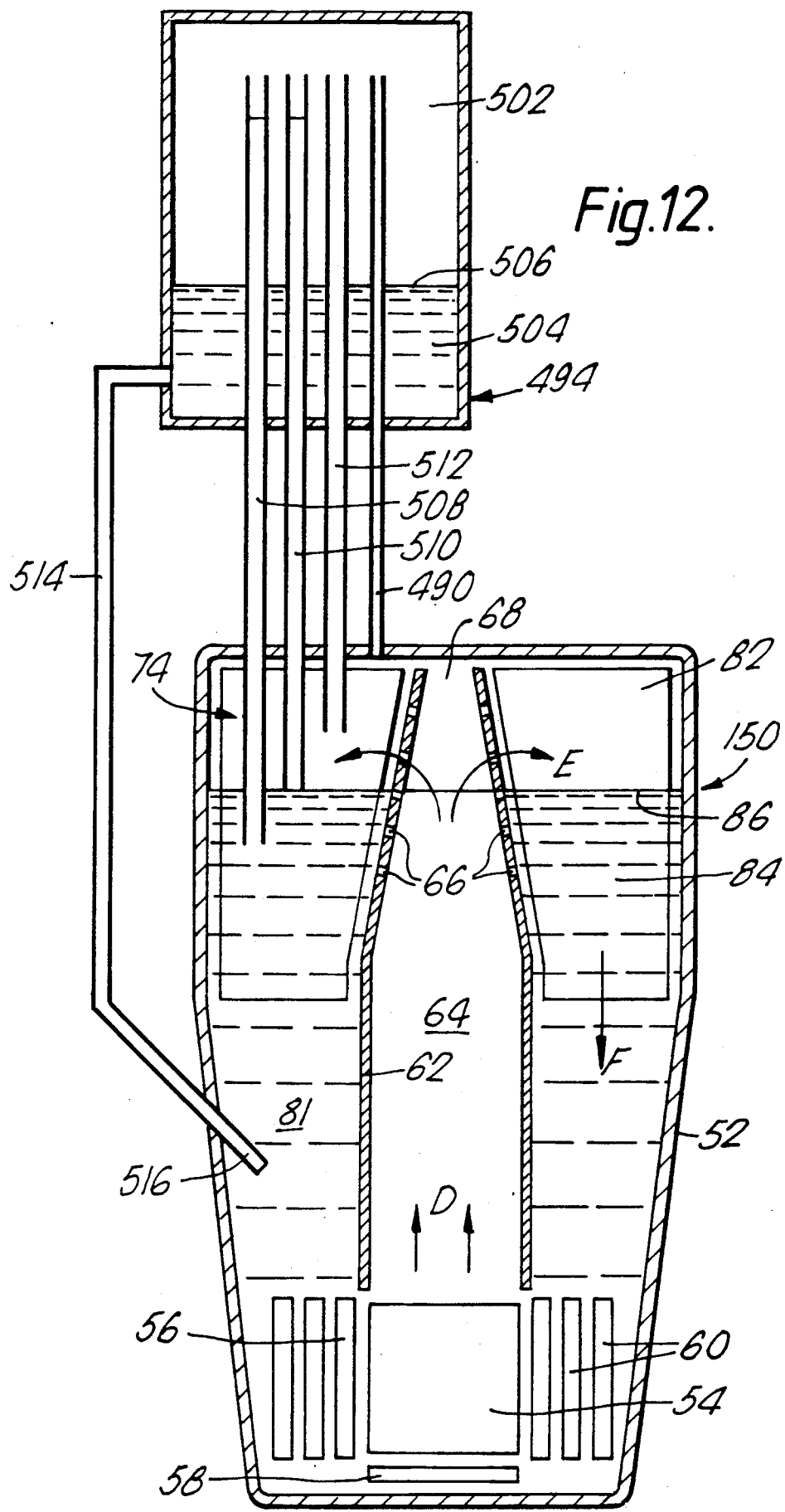
FIG. 12 is a vertical cross-sectional diagrammatical view of an embodiment of a water cooled nuclear reactor with separate pressuriser according to the present invention.
Figure 13:
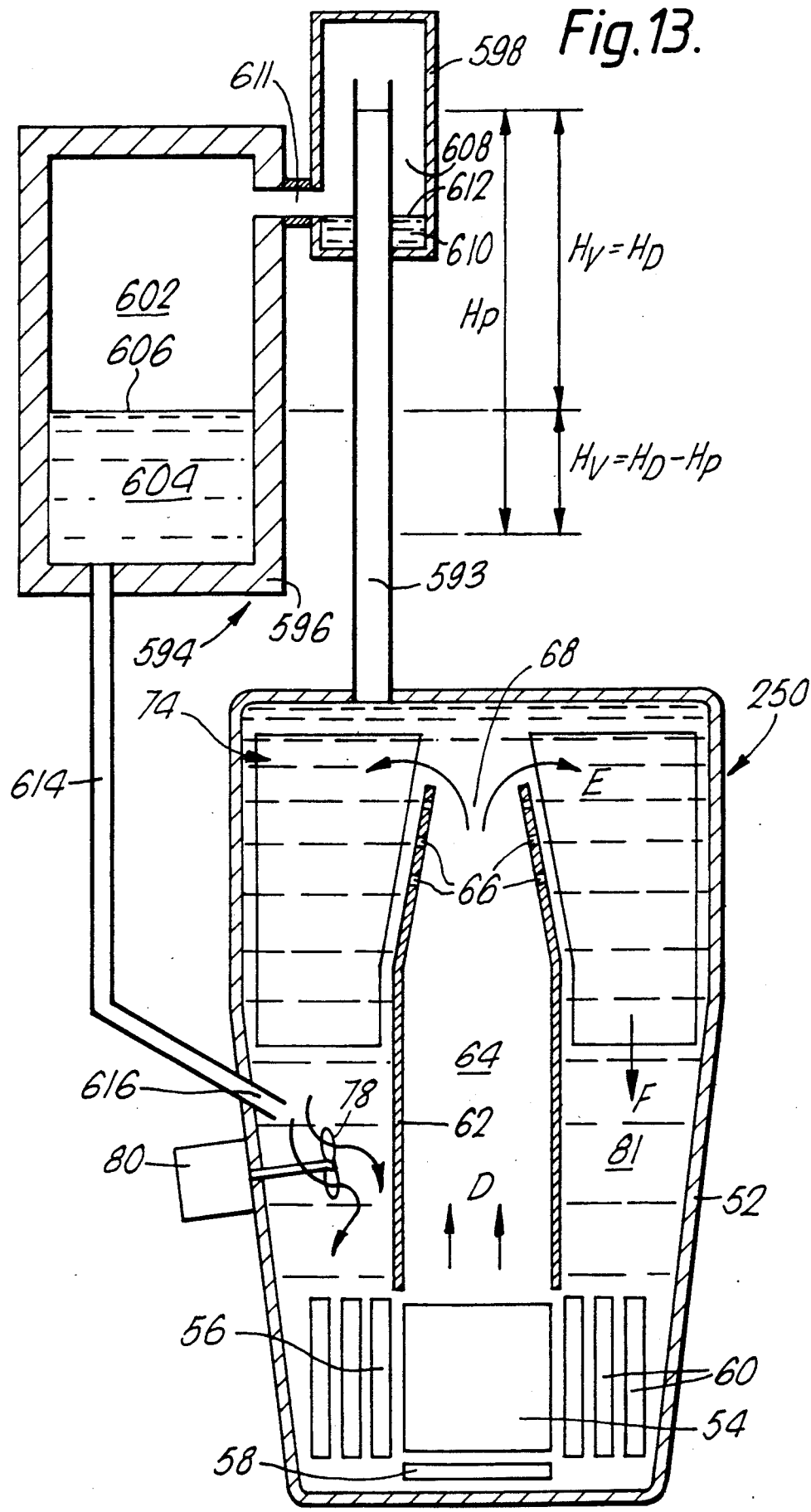
FIG. 13 is a vertical cross-sectional diagrammatical view of a further embodiment of a water cooled nuclear reactor with separate pressuriser according to the present invention.

FIGS. 12 and 13 show integral water cooled nuclear reactors with separate pressurisers. FIG. 12 shows an integral indirect cycle BWR nuclear reactor 150 and FIG. 13 shows an integral PWR nuclear reactor 250.

In FIG. 12 an indirect cycle BWR nuclear reactor 150 is shown, and a separate external pressuriser 494. A number of vent pipes 508,510 and 512 interconnect a steam space 502 in the pressuriser 494 with an upper portion of the primary water coolant circuit in the region of the heat exchanger 74. The vent pipes extend to different depths into the primary water coolant circuit, but all extend to the same elevation in the pressuriser 494. A vent 490 interconnects the steam space 82 of the BWR nuclear reactor with the steam space 502 of the pressuriser 494 for the flow of incondensibles.

A pipe 514 interconnects a water space 504 of the pressuriser 494 with a downcomer passage 81 of the primary water coolant circuit via a surge port 516.

In FIG. 13 an integral PWR nuclear reactor 250 is shown, and a separate external pressuriser 594. A single vent pipe 593 interconnects a steam space 602,608 in the pressuriser 594 with an upper portion of the primary water coolant circuit, and a pipe 614 interconnects a water space 604 of the pressuriser 594 with a downcomer passage 81 of the primary water coolant circuit via a surge port 616.

The pressuriser 594 shown, is for use when the head of water HV=HD is higher than the pressuriser 594. The pressuriser 594 comprises a main vessel 596 and a secondary vessel 598. The secondary vessel 598 is provided at the upper end of the vent pipe 593, and the secondary vessel 598 has a steam space 608 and a water space 610 separated by a water level 612. The secondary vessel 598 is interconnected with the main vessel 596 by a pipe 611. The pipe 611 connects with the secondary vessel 598 at the water level 612, and connects with the main vessel 596 above the water level 606.

Steam condensing in the secondary vessel 598 drain from the water space 610 through pipe 611 into the water space 604 of the main vessel 604.

Figure 14:
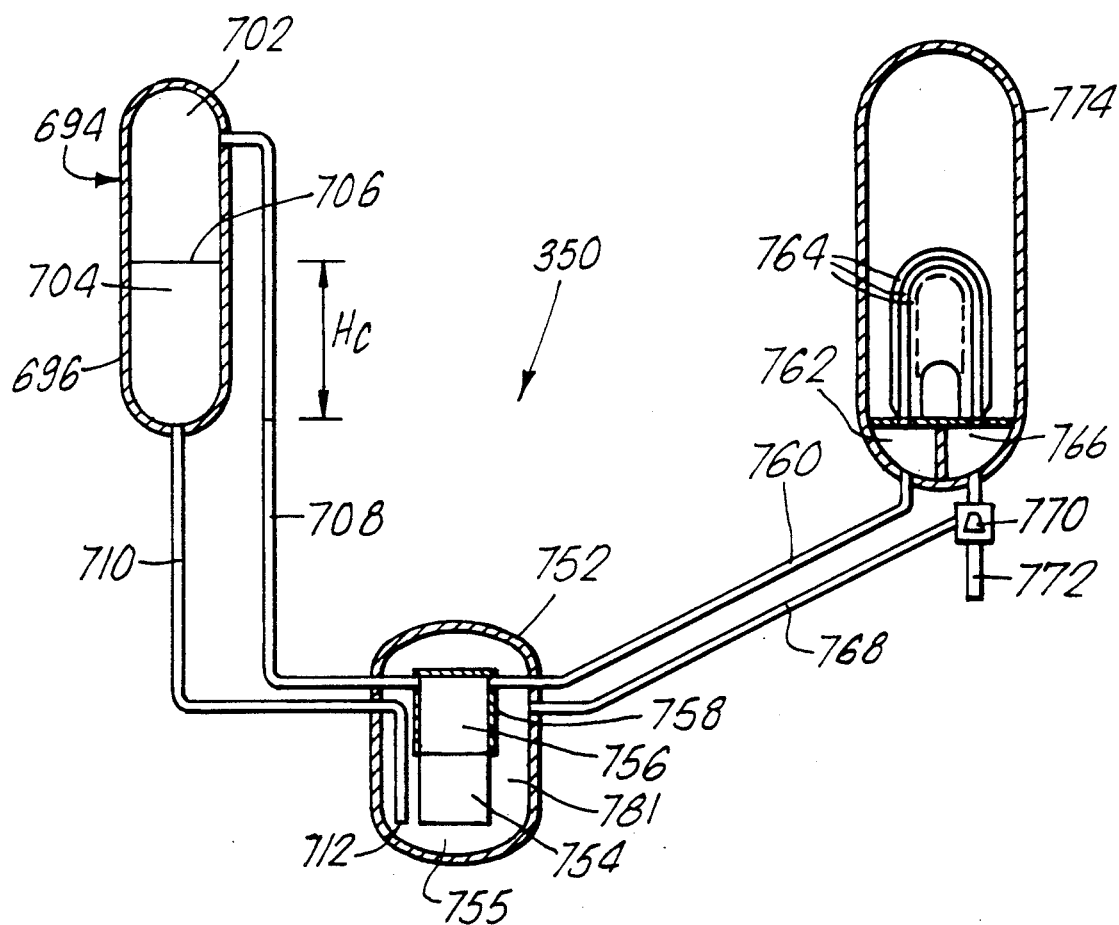
FIG. 14 is a vertical cross-sectional diagrammatical view of a further embodiment of a dispersed water cooled nuclear reactor with separate pressurisers.

In FIG. 14, the present invention is shown applied to a single loop dispersed PWR nuclear reactor 350, although the invention is applicable to arrangements with two, three or four loops, which are more typical.

The dispersed PWR nuclear reactor 350 comprises a pressure vessel 752 within which is positioned a reactor core 754. The reactor core includes a system of neutron absorbing movable control rods linked to drive mechanisms (not shown). A primary water coolant circuit is provided to cool the reactor core 754. The primary water coolant circuit comprises a riser plenum or reactor core exit plenum 756, a first pipe 760 which conveys relatively hot water to an inlet header 762 in a heat exchanger 774 i.e. a steam generator. The inlet header 762 supplies the hot water through a bank of steam generator tubes 764 to an outlet header 766. The relatively cool water is returned through a second pipe 768 to a downcomer 781 which returns the now cool water via a reactor core inlet plenum 755 to the reactor core 754. A pump 770 is provided to drive the water through the primary water coolant circuit and the pump 770 is driven by a motor 772.

The heat exchanger or steam generator 774 in this example is positioned outside of the pressure vessel 752 which contains the reactor core 754, and only a portion of the primary water coolant circuit is contained within the pressure vessel 752.

Although only one heat exchanger or steam generator 774 is shown in FIG. 14, two, three or four heat exchangers or steam generators may be provided together with respective pipes 760 and 768.

A separate pressuriser 694 is provided to maintain the primary water coolant in the primary water coolant circuit at a high pressure so that high primary water coolant temperatures can be achieved without the primary water coolant boiling. The pressuriser 694 comprises a separate pressure vessel 696 containing a steam space 702 and a water space 704 separated by a water level 706.

A surge pipe 710 interconnects the water space 704 of the pressuriser 694 with the downcomer 781 of the primary water coolant circuit or the reactor core inlet plenum 755. The surge pipe 710 has a surge port 712.

A vent pipe 708 interconnects the riser plenum or reactor core exit plenum 756 with the steam space 702 of the pressuriser 694.

The surge port 712 may incorporate a hydraulic diode to give a low resistance to surge flow from the pressuriser water space 704 to the primary water coolant circuit, and a high resistance to surge flow from the primary water coolant circuit to the water space 704 of the pressuriser, so that a substantial surge flow passes through the vent pipe 708 from the primary water coolant circuit to the pressuriser steam space 702 to effect desuperheating of the pressuriser steam space 702 during positive volume surges.

A major function of the integral or separate pressuriser of this invention is that the generation of vapour in the reactor core or reactor pressure vessel cannot flood the pressuriser and steam blanket the primary circuit and reactor core. A further advantage is that a lower system pressure can be used than with the simple pressuriser/surgeline arrangement of the prior art. The pressure need only be high enough to suppress, limit or control boiling at the prevailing reactor core outlet temperature, to suit the design of the reactor core installed. Conversely, for a given system pressure the reactor core outlet temperature and secondary steam conditions can be maximised. In the case of the Integral boiling water reactor core outlet temperatures of 300° C. could be obtained with 86 bars pressure i.e. $8 \times 10^6 Nm^{-2}$ compared to pressure in excess of 150 bars i.e. $15 \times 10^6 Nm^{-2}$ for a dispersed pressurised water reactor.

The arrangements according to the present invention are unconditionally stable with respect to large and small perturbations in the primary circuit. They facilitate both integral PWR and integral indirect cycle BWR variants. They prevent vapour locking of the reactor core and primary water coolant circuit. They facilitate natural convection cooling of the reactor core during normal and accident conditions. They facilitate effective pressure control and regulation of integral water cooled nuclear reactors.

We claim:

1. A water cooled reactor and pressuriser assembly comprising a reactor core, a primary coolant circuit, a pressuriser, a pressure vessel, at least one vent conduit and at least one surge conduit, the reactor core and at least a portion of the primary water coolant circuit being enclosed by the pressure vessel, the primary water coolant being arranged to cool the reactor core, the primary water coolant circuit having an upper portion and a lower portion, the lower portion being positioned below any normal effective range of water levels of the primary water coolant circuit, the upper portion being positioned above the lower portion, the pressuriser having a water spaced and a steam space, at least a portion of the water space of the pressuriser being positioned above the upper portion of the primary water coolant circuit.

the at least one surge conduit communicating between the pressuriser and the primary water coolant circuit to connect the water space of the pressuriser with the lower portion of the primary water coolant circuit, the at least one surge conduit being arranged to have a relatively low flow resistance for water from the water space of the pressuriser to the primary water coolant circuit and a relatively high flow resistance for water from the primary water coolant circuit to the water space of the pressuriser, the at least one vent conduit communicating between the pressuriser and the primary water coolant circuit to connect the steam space of the pressuriser with the upper portion of the primary water coolant circuit whereby the at least one vent conduit which communicates between the steam space of the pressuriser and the upper portion of the primary water coolant circuit allows excess vapour formed in the primary water coolant circuit to flow to the steam space of the pressuriser to increase the stability of the assembly.

2. A water cooled nuclear reactor as claimed in claim 1 in which the pressure vessel has a lower region, and an upper region, the reactor core is arranged in the lower region of the pressure vessel, the primary coolant circuit comprising a riser passage and a downcomer passage, at least one heat exchanger, the riser passage conveys relatively hot water and steam to the at least one heat exchanger, the downcomer passage conveys relatively cool water from the at least one heat exchanger to the reactor core.

3. A water cooled nuclear reactor as claimed in claim 2 in which the at least one heat exchanger is positioned in the upper region of the downcomer passage.

4. A water cooled nuclear reactor as claimed in claim 3 in which the at least one heat exchanger is a steam generator.

5. A water cooled nuclear reactor as claimed in claim 1 in which the primary water coolant circuit comprises at least one pump to assist the circulation of primary water coolant.

6. A water cooled nuclear reactor as claimed in claim 3 in which the reactor core, the primary coolant circuit and the pressuriser are arranged as an integral unit enclosed by the pressure vessel, at least one casing being arranged in the pressure vessel to substantially divide the pressure vessel into a first chamber and a second chamber, the reactor core and the primary coolant circuit being arranged in the second chamber, the pressuriser being arranged in the first chamber, the casing preventing interaction between the water in the primary water coolant circuit and the water in the water space of the pressuriser.

7. A water cooled nuclear reactor as claimed in claim 6 in which the pressuriser forms a surge tank positioned in the first chamber, the surge tank being defined by the pressure vessel and the casing.

8. A water cooled nuclear reactor as claimed in claim 7 in which the casing comprise a peripheral region and an annular member, the annular member extends downwards from the peripheral region of the casing, an annular passage being formed between the annular member of the casing and the pressure vessel for the flow of water from the water space of the pressuriser to the primary coolant circuit.

9. A water cooled nuclear reactor as claimed in claim 7 in which the casing comprise a peripheral region and an annular member, the annular member extends downwards from the peripheral region of the casing, the annular member being secured to the pressure vessel to form an annular lower portion of the surge tank with the pressure vessel.

10. A water cooled nuclear reactor as claimed in claim 7 in which the casing comprises a peripheral region, a central region and an annular member, the annular member extends downwards from the central region of the casing, the peripheral region of the casing being secured to the pressure vessel, the annular member having a lower end, the annular member being sealed at its lower end to form a lower portion of the surge tank.

11. A water cooled nuclear reactor as claimed in claim 7 in which a peripheral region of the casing is secured to the pressure vessel.

12. A water cooled nuclear reactor as claimed in claim 6 in which the casing is arranged to divide the pressure vessel into a first vertically upper chamber and a second vertically lower chamber.

13. A water cooled nuclear reactor as claimed in claim 8 in which the casing comprises a bottom member positioned below the reactor core, the casing dividing the pressure vessel into a first outer chamber and a second inner chamber, the second inner chamber being substantially defined by the casing.

14. A water cooled nuclear reactor as claimed in claim 7, in which the water space of the surge tank has a lower portion, the at least one surge conduit connects the lower portion of the water space of the surge tank with a portion of the downcomer passage in the region of the heat exchanger.

15. A water cooled nuclear reactor as claimed in claim 7, in which the water space of the surge tank has a lower portion, the at least one surge conduit connects the lower portion of the water space of the surge tank with the primary water coolant circuit in the region of the reactor core.

16. A water cooled nuclear reactor as claimed in claim 15 in which the at least one surge conduit connects the lower portion of the water space of the surge tank with the primary water coolant circuit below the reactor core.

17. A water cooled nuclear reactor as claimed in claim 7, in which the water space of the surge tank has a lower portion, the at least one surge conduit connects the lower portion of the water space of the surge tank with a lower portion of the downcomer passage below the heat exchanger.

18. A water cooled nuclear reactor as claimed in claim 2 in which the riser passage is defined by a hollow cylindrical member, the downcomer passage being defined between the hollow cylindrical member and the at least a part of the pressure vessel.

19. A water cooled nuclear reactor as claimed in claim 13 in which the riser passage is defined by a hollow cylindrical member, the downcomer passage being defined between the hollow cylindrical member and the casing.

20. A water cooled nuclear reactor as claimed in claim 1 in which the at least one surge conduit comprises a re-entrant nozzle.

21. A water cooled nuclear reactor as claimed in claim 1 in which the at least one surge conduit comprises a hydraulic diode.

22. A water cooled nuclear reactor as claimed in claim 1 in which the at least one vent conduit which communicates between the pressuriser and the primary coolant circuit comprises at least one pipe which interconnects at least one port in the casing with the steam space in the pressuriser.

23. A water cooled nuclear reactor as claimed in claim 1 in which at least one of the vent conduits which communicate between the pressuriser and the primary water coolant circuit comprises a spray nozzle.

24. A water cooled nuclear reactor as claimed in claim 2 in which at least one of the means which communicates between the pressuriser and the primary water coolant circuit connects the steam space of the pressuriser with the primary water coolant circuit above the heat exchanger.

25. A water cooled nuclear reactor as claimed in claim 1 in which the water cooled nuclear reactor is an integral pressurised water reactor.

26. A water cooled nuclear reactor as claimed in claim 25 in which the pressuriser has heating means to heat the water in the water space.

27. A water cooled nuclear reactor as claimed in claim 1 in which the water cooled nuclear reactor is an integral indirect cycle boiling water reactor, the at least one vent conduit which communicates between the steam space of the pressuriser and the upper portion of the primary water coolant circuit controls the effective water level in the primary water coolant circuit.

28. A water cooled nuclear reactor as claimed in claim 1 in which the pressuriser is a separate pressuriser.

29. A water cooled nuclear reactor as claimed in claim 28 in which the water cooled nuclear reactor is an integral indirect cycle boiling water reactor, the at least one vent conduit which communicates between the steam space of the pressuriser and the upper portion of the primary water coolant circuit controls the effective water level in the primary water coolant circuit.

30. A water cooled nuclear reactor as claimed in claim 28 in which the water cooled nuclear reactor is an integral pressurised water reactor.

31. A water cooled nuclear reactor as claimed in claim 2 in which the at least one vent conduit extends into the pressuriser steam space by at least a distance equal to the head loss due to flow in the downcomer passage between the normal effective range of water levels of the primary water coolant circuit and the elevation at which the at least one surge conduit communicates with the lower portion of the primary water coolant circuit.

32. A water cooled nuclear reactor as claimed in claim 31 in which the at least one surge conduit communicates with the lower portion of the primary water coolant circuit at the highest practical evaluation below the normal effective range of water levels of the primary water coolant circuit to minimize the distance that the at least one vent conduit extends into the pressuriser steam space.

33. A water cooled nuclear reactor as claimed in claim 27 in which a plurality of vent conduits communicate between the steam space of the pressuriser and the upper portion of the primary water coolant circuit, the vent conduits extending into the primary water coolant circuit to different elevations.

34. A water cooled nuclear reactor as claimed in claim 29 in which a plurality of vent conduits communicate between the steam space of the pressuriser and the upper portion of the primary water coolant circuit, the vent conduits extending into the primary water coolant circuit to different elevations.

35. A water coolant integral indirect cycle boiling reactor and pressuriser assembly comprising a reactor core, a primary coolant circuit, a pressuriser, a pressure vessel, a plurality of vent conduits and at least one surge conduit, the reactor core and at least a portion of the primary water coolant circuit being enclosed by the pressure vessel, the primary water coolant circuit being arranged to cool the reactor core, the primary water coolant circuit having an upper portion, and a lower portion, the lower portion being positioned below any normal effective range of water levels of the primary water coolant circuit, the upper portion being positioned above the lower portion, the pressuriser having a water space and a steam space, at least a portion of the water space of the pressuriser being positioned above the upper portion of the primary water coolant circuit, the at least one surge conduit communicating between the pressuriser and the primary water coolant circuit to connect the water space of the pressuriser with the lower portion of the primary water coolant circuit, the at least one surge conduit being arranged to have a relatively low flow resistance for water from the water space of the pressuriser to the primary water coolant circuit and a relatively high flow resistance for water from the primary water coolant circuit to the water space of the pressuriser, the plurality of vent conduits communicating between the pressuriser and the primary water coolant circuit to connect the steam space of the pressuriser with the upper portion of the primary water coolant circuit, each of the plurality of vent conduits extending into the primary water coolant circuit to a different elevation, the plurality of vent conduits allowing excess vapour formed in the primary water coolant circuit to flow to the steam space of the pressuriser to increase the stability of the assembly, the plurality of vent conduits controlling the effective water level in the primary water coolant circuit.

* * * * *